US012738479B2

(12) United States Patent
Lv et al.

(10) Patent No.: US 12,738,479 B2
(45) Date of Patent: Sep. 15, 2026

(54) COMPOSITE CATHODE ACTIVE MATERIAL, PREPARATION METHOD THEREOF, CATHODE SHEET AND LITHIUM ION SECONDARY BATTERY

(71) Applicant: MURATA MANUFACTURING CO., LTD., Kyoto (JP)

(72) Inventors: Jixian Lv, Shanghai (CN); Yuli Li, Shanghai (CN); Siming Yang, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 1033 days.

(21) Appl. No.: 17/706,942

(22) Filed: Mar. 29, 2022

(65) Prior Publication Data

US 2022/0336796 A1 Oct. 20, 2022

(30) Foreign Application Priority Data

Apr. 20, 2021 (CN) ......................... 202110423357.0

(51) Int. Cl.

| | |
|---|---|
| ***H01M 4/36*** | (2006.01) |
| ***H01M 4/04*** | (2006.01) |
| ***H01M 4/505*** | (2010.01) |
| ***H01M 4/525*** | (2010.01) |
| ***H01M 10/0525*** | (2010.01) |
| *H01M 4/02* | (2006.01) |

(52) U.S. Cl.

CPC ......... *H01M 4/366* (2013.01); *H01M 4/0471* (2013.01); *H01M 4/505* (2013.01); *H01M 4/525* (2013.01); *H01M 10/0525* (2013.01); *H01M 2004/028* (2013.01)

(58) Field of Classification Search

CPC ........... H01M 4/366; H01M 2004/028; H01M 4/364; H01M 4/505; H01M 4/525; H01M 4/36

See application file for complete search history.

(56) References Cited

U.S. PATENT DOCUMENTS

| | | | | |
|---|---|---|---|---|
| 10,535,873 | B2 * | 1/2020 | Lee | H01M 10/0525 |
| 2016/0329563 | A1 * | 11/2016 | Oh | H01M 4/505 |
| 2018/0079655 | A1 * | 3/2018 | Dai | H01M 4/505 |

FOREIGN PATENT DOCUMENTS

| | | |
|---|---|---|
| CN | 102569775 A | 7/2012 |
| CN | 102931384 A | 2/2013 |
| CN | 108232131 A | 6/2018 |
| JP | 2014-116308 | 6/2014 |
| JP | 2015-015169 | 1/2015 |
| JP | 2018-523277 | 8/2018 |
| KR | 20070018293 A | 2/2007 |

OTHER PUBLICATIONS

Japanese Office Action issued Mar. 7, 2023 in corresponding Japanese Application No. 2022-050298.
Chinese Office Action dated Feb. 24, 2025 for corresponding CN application No. 202110423357 (6 pages).
Office Action issued for corresponding Chinese Patent Application No. 202110423357.0, dated Oct. 13, 2025. (7 pages.).
Search Report issued for corresponding Chinese Patent Application No. 202110423357.0, dated Oct. 11, 2025. (3 pages.).

* cited by examiner

*Primary Examiner* — Kaj K Olsen
(74) *Attorney, Agent, or Firm* — K&L Gates LLP

(57) ABSTRACT

A composite cathode active material, which comprises a core layer comprising a cathode active material; a hydrogen fluoride barrier layer coating the core layer, the hydrogen fluoride barrier layer comprising a substance consisting of any one of Nb, Ba, Zr, Mn, Mg, Al and Ca or any combination thereof and any one of O, F, B and P or any combination thereof; and a physical barrier layer coating the hydrogen fluoride barrier layer. By using the composite cathode active material of the present invention, the contacting and reacting of the hydrogen fluoride with cathode active material are effectively prevented, the dissolution of the metal in the cathode active material is inhibited, the stability of the crystal structure in the bulk phase of the cathode active material is ensured, and the increase of the cycle retention rate and the decrease of the impedance growth rate are realized.

11 Claims, No Drawings

COMPOSITE CATHODE ACTIVE MATERIAL, PREPARATION METHOD THEREOF, CATHODE SHEET AND LITHIUM ION SECONDARY BATTERY

TECHNICAL FIELD

The present invention relates to the field of lithium ion secondary batteries, in particular to a composite cathode active material, preparation method thereof, and cathode sheet and lithium ion secondary battery including the same.

BACKGROUND

In recent years, along with the continuous development of electronic technology, the requirements for people to a battery device for supporting energy supply of electronic device are also continuously increasing. Nowadays, batteries capable of storing a high amount of electricity and outputting high power are needed. Traditional lead-acid batteries, and nickel-metal hydride batteries and the like may not meet the requirements of new electronic products. Therefore, lithium batteries have attracted more and more attentions of the people. During the development process of the lithium battery, capacity and performance thereof have been more effectively improved.

In the prior art, lithium cobalt oxide (LCO), lithium nickel cobalt aluminate (NCA) and lithium nickel cobalt manganate (NCM) are usually used as cathode active materials of batteries. In the process of using lithium ion secondary battery, a small amount of water molecules are inevitably contained in the electrolyte. After the small amount of water molecules contacting with fluorine-containing substances in the electrolyte, the electrolyte will be hydrolyzed and hydrofluoric acid (HF) will be produced. After preceding a large number of electric cycles, the accumulated hydrofluoric acid will react with the cathode active material as follows:

$$2HF+LiCoO_2 \rightarrow CoO+LiF+H_2O;$$

$$10HF+10LiNi_{0.5}Co_{0.3}Mn_{0.2}O_{1.8} \rightarrow 10LiF+5H_2O+5NiO+2MnO_2+Co_3O_4; \text{ and}$$

$$10HF+10LiNi_{0.5}Co_{0.3}Al_{0.2}O_{1.7} \rightarrow 10LiF+5H_2O+5NiO+Al_2O_3+Co_3O_4,$$

leading to the oxygen evolution in the cathode active material, and thus the destruction of its crystal structure. When the cathode active material is heavily corroded, its reaction products will aggregate on the surface of cathode, which will adversely affect the transmission of lithium ions. In addition, the destruction of the crystal structure of the cathode active material and the accumulation of the by-products will also reduce the capacity of the cathode active material and increase the impedance of the cathode material. Finally, leading to the increasing of the impedance of lithium ion secondary battery, and the declining of performances such as cycle retention rate and expansion and the like, which seriously affect the performance of the lithium ion battery.

In order to avoid the corrosion of hydrogen fluoride to the cathode active material, it is usually coating the cathode active material in the prior art so as to avoiding the contacting of the cathode active material with hydrogen fluoride. The coating materials commonly used are aluminum, aluminum oxide and aluminate. However, since the lithium ions are needed to be embedded in and disembedded out of the cathode active material, the coating layer covering the cathode active material may not be a dense material, so that a part of hydrogen fluoride may still enter the interior of the coating layer and react with the cathode active material, which adversely affects the electrical performance of the lithium ion secondary battery. In addition, only aluminum, aluminum oxide and aluminate are used as barrier layers to coat the cathode active material in the prior art, although the contacting of the hydrogen fluoride with the cathode active material is blocked in a certain extent, the impedance of the cathode composite generated therefrom is adversely increased due to the higher impedance of the coating material.

SUMMARY

The main object of the present invention is to provide a composite cathode active material, a preparation method, a cathode sheet and a lithium ion secondary battery, so as to solve the problem in the prior art that the cathode active material for coating the lithium ion secondary battery may not effectively block the contacting of the hydrogen fluoride with the cathode active material.

For achieving the above object, according to one aspect of the present invention, a composite cathode active material is provided, the composite cathode active material comprises a core layer comprising a cathode active material; a hydrogen fluoride barrier layer coating the core layer, the hydrogen fluoride barrier layer comprising a substance consisting of any one of Nb, Ba, Zr, Mn, Mg, Al and Ca or any combination thereof and any one of O, F, B and P or any combination thereof; and a physical barrier layer coating the hydrogen fluoride barrier layer.

Further, in the above composite cathode active material, the hydrogen fluoride barrier layer comprises a substance consisting of any one of Nb, Zr, Mg, Al and Mn or any combination thereof and any one of O, F, B and P or any combination thereof.

Further, in the above composite cathode active material, based on 100 parts by weight of the core layer, the amount of the hydrogen fluoride barrier layer is in the range of about 0.02 to about 10 parts by weight, preferably the amount of the hydrogen fluoride barrier layer is in the range of about 5 to about 10 parts by weight.

Further, in the above composite cathode active material, the thickness of the hydrogen fluoride barrier layer is in the range of about 1 to about 500 nm, preferably the thickness of the hydrogen fluoride barrier layer is in the range of about 50 to about 500 nm, more preferably the thickness of the hydrogen fluoride barrier layer is in the range of about 250 to about 500 nm.

Further, in the above composite cathode active material, the physical barrier layer comprises a substance consisting of any one of Ta, W, Hf, Zr, Nb, Sc, Zn and Al or any combination thereof and any one of O and P or any combination thereof; preferably, the physical barrier layer comprises a substance consisting of any one of Ta, W, Zr, Nb, Sc, Zn and Al or any combination thereof and any one of O and P or any combination thereof.

Further, in the above composite cathode active material, based on 100 parts by weight of the core layer, the amount of the physical barrier layer is in the range of about 0.02 to about 5 parts by weight, preferably the amount of the physical barrier layer is in the range of about 0.02 to about 2.5 parts by weight.

Further, in the above composite cathode active material, the thickness of the physical barrier layer is in the range of 1 to 250 nm, preferably the thickness of the physical barrier layer is in the range of 1 to 125 nm, more preferably the thickness of the physical barrier layer is in the range of 25 to 125 nm.

Further, in the above composite cathode active material, the cathode active material comprises any one of composite lithium cobalt oxide with a general formula of $LiCo_{1-\alpha}M_{\alpha}O_2$, lithium nickel-cobalt manganate with a general formula of $LiNi_{1-x-y}Co_xMn_yO_2$ and lithium nickel-cobalt aluminate with a general formula of $LiNi_{1-x-y}Co_xAl_yO_2$ or any combination thereof, wherein $0<\alpha\leq0.2$, $0\leq x\leq1$, $0\leq y\leq1$ and $0\leq x+y\leq1$, M is selected from any one of alkaline earth metal elements and transition metal elements or any combination thereof, providing that the sum of the valence states of the compounds of the above general formula is zero.

Further, in the above composite cathode active material, the composite cathode active material further comprises a sacrificial layer arranged between the core layer and the hydrogen fluoride barrier layer.

Further, in the above composite cathode active material, the sacrificial layer comprises a substance consisting of any one of Ti, Al, Mg, Zr, Sr, Zn, W and Sc or any combination thereof and any one of O, F and B or any combination thereof; preferably, the sacrificial layer comprises a substance consisting of any one of element Ti, Al, Zr, W and Mg or any combination thereof and any one of O, F and B or any combination thereof.

Further, in the above composite cathode active material, based on 100 parts by weight of the core layer, the amount of the sacrificial layer is in the range of about 0.02 to about 5 parts by weight, preferably the amount of the sacrificial layer is in the range of about 2.5 to about 5 parts by weight.

Further, in the above composite cathode active material, the thickness of the sacrificial layer is in the range of about 1 to about 250 nm, preferably the thickness of the sacrificial layer is in the range of about 25 to about 250 nm, more preferably the thickness of the sacrificial layer is in the range of about 125 to about 250 nm.

According to another aspect of the present invention, a method for preparing a composite cathode active material is provided. The method comprises: step S1-1, mixing the hydrogen fluoride barrier layer precursor material and the active material particles to obtain a first mixture, calcining the first mixture in the temperature range of about 250° C. to about 350° C. for about 2 to about 4 hours, crushing the calcined product and sieving with 200 to 400 mesh sieve to obtain the hydrogen fluoride barrier layer coating product, the hydrogen fluoride barrier layer precursor material comprising any one of elementary substance of Nb, Ba, Zr, Mn, Ca, Mg, Al and their oxides, fluorides, borates, sulfates and phosphates or any combination thereof; and step S2-1, mixing the physical barrier layer precursor material and the hydrogen fluoride barrier layer coating product to obtain a second mixture, calcining the second mixture in the temperature range of about 500° C. to about 600° C. for about 2 to 4 hours, crushing the calcined product and sieving with 200 to 400 mesh sieve to obtain the composite cathode active material.

According to another aspect of the present invention, a method for preparing a composite cathode active material is provided. The method comprises: step S1-2, mixing the sacrificial layer precursor material and the active material particles to obtain a first mixture, calcining the first mixture in the temperature range of about 250° C. to about 350° C. for about 2 to about 4 hours, crushing the calcined product and sieving with 200 to 400 mesh sieve to obtain the first coating product, the sacrificial layer precursor material comprising any one of elementary substance of Ti, Al, Mg, Zr, Sr, Zn, Sc, W and their oxides, fluorides, and borates or any combination thereof; step S2-2, mixing the hydrogen fluoride barrier layer precursor material and the first coating product to obtain a second mixture, calcining the second mixture in the temperature range of about 250° C. to about 350° C. for about 2 to about 4 hours, crushing the calcined product and sieving with 200 to 400 mesh sieve to obtain a second coating product, the hydrogen fluoride barrier layer precursor material comprising any one of elementary substance of Nb, Ba, Zr, Mn, Ca, Mg, Al and their oxides, fluorides, borates, sulfates and phosphates or any combination thereof; and step S3-2, mixing the physical barrier layer precursor material and the second coating product to obtain a third mixture, calcining the third mixture in the temperature range of about 500° C. to about 600° C. for about 2 to about 4 hours, crushing the calcined product and sieving with 200 to 400 mesh sieve to obtain the composite cathode active material.

Further, in the above method, the sacrificial layer precursor material comprises a first sacrificial layer precursor substance, a second sacrificial layer precursor substance and an optional third sacrificial layer precursor substance, the first sacrificial layer precursor substance, the second sacrificial layer precursor substance and the third sacrificial layer precursor substance are different from each other, and wherein, the amount of the first sacrificial layer precursor substance and the amount of the second sacrificial layer precursor substance are in the range of about 20 to about 70 parts by weight, respectively, and the amount of the optional third sacrificial layer precursor substance is in the range of about 0 to about 50 parts by weight, so that the first sacrificial layer precursor substance, the second sacrificial layer precursor substance and the optional third sacrificial layer precursor substance constitute 100 parts by weight of the sacrificial layer precursor material.

Further, in the above method, the hydrogen fluoride barrier layer precursor material comprises a first hydrogen fluoride barrier layer precursor substance and a second hydrogen fluoride barrier layer precursor substance, the first hydrogen fluoride barrier layer precursor substance and the second hydrogen fluoride barrier layer precursor substance are different from each other, and wherein, the amount of the first hydrogen fluoride barrier layer precursor substance and the amount of the second hydrogen fluoride barrier layer precursor substance are in the range of about 30 to about 70 parts by weight, respectively, so that the first hydrogen fluoride barrier layer precursor substance and the second hydrogen fluoride barrier layer precursor substance constitute 100 parts by weight of the hydrogen fluoride barrier layer precursor material.

Further, in the above method, the physical barrier layer precursor material comprises any one of elementary substance of Ta, W, Hf, Zr, Nb, Sc, Zn and Al, and their oxides and phosphates or any combination thereof; preferably, the physical barrier layer precursor material comprises a first physical barrier layer precursor substance, a second physical barrier layer precursor substance and an optional third physical barrier layer precursor substance, wherein the first physical barrier layer precursor substance, the second physical barrier layer precursor substance and the third physical barrier layer precursor substance are different from each other, and wherein, the amount of the first physical barrier layer precursor substance and the amount of the second physical barrier layer precursor substance are in the range of about 20 to about 70 parts by weight, respectively, and the amount of the optional third physical barrier layer precursor substance is in the range of about 0 to about 50 parts by weight, so that the first physical barrier layer precursor substance, the second physical barrier layer precursor substance and the optional third physical barrier layer precursor substance constitute 100 parts by weight of the physical barrier layer precursor material.

According to yet another aspect of the present invention, a cathode sheet of a lithium ion secondary battery is provided. The cathode sheet comprises a composite cathode active material of any one of the above.

According to yet another aspect of the present invention, a lithium ion secondary battery is provided. The lithium ion secondary battery comprises a cathode sheet, an anode sheet, and a separator, wherein, the cathode sheet comprises a composite cathode active material of any one of the above.

By using the composite cathode active material, preparation method thereof, cathode sheet and lithium ion secondary battery of the present invention, the contacting and reacting of the hydrogen fluoride with cathode active material are effectively prevented, the dissolution of the metal in the cathode active material is inhibited, the stability of the crystal structure in the bulk phase of the cathode active material is ensured, so that the lithium ion secondary battery containing the same may still maintain good power discharge capacity after proceeding multiple cycles, and the increasing of the cycle retention rate and the declining of the impedance growth rate are realized.

DETAILED DESCRIPTION OF THE EMBODIMENTS

It is noted that embodiments in the present disclosure and features in the embodiments may be mutually combined with each other without departing from the spirit of the present disclosure. The present disclosure is described in detail below in combination with the embodiments. The following embodiments are only exemplary, and do not constitute limitation to a scope of protection of the present disclosure.

As described in the background technology, in the prior art, aluminum, aluminum oxide or aluminate is usually used to coat the cathode active material of lithium ion secondary battery. However, since the above materials may not effectively block the contacting of hydrogen fluoride with cathode active materials, they still need to be further improved. In view of the problems appeared in the prior art, according to a typical embodiment of the present application, a composite cathode active material is provided, which comprises a core layer, a hydrogen fluoride barrier layer and a physical barrier layer. The core layer comprises a cathode active material, the hydrogen fluoride barrier layer covers the core layer, and the physical barrier layer covers the hydrogen fluoride barrier layer. The hydrogen fluoride barrier layer comprises a substance consisting of any one of Nb, Ba, Zr, Mn, Mg, Al and Ca or any combination thereof and any one of O, F, B and P or any combination thereof.

Different from the cathode active material of lithium ion secondary battery coated with aluminum, aluminum oxide or aluminate in the prior art, in the composite cathode active material of the present application, the core layer is first coated with a hydrogen fluoride barrier layer, and then the hydrogen fluoride barrier layer is coated with a physical barrier layer. Since the present application adopts the structure coated with two layers of the physical barrier layer and the hydrogen fluoride barrier layer, the hydrogen fluoride existing in the electrolyte is completely blocked outside of the two barrier layers. In some embodiments, hydrogen fluoride is completely blocked outside the physical barrier layer so that the cathode active material inside of the two barrier layers will not be affected. In other embodiments, hydrogen fluoride may partially penetrate into the physical barrier layer, but will not enter into the hydrogen fluoride barrier layer to corrode the cathode active material. Therefore, by using the composite cathode active material of the present application, the contacting and reacting of the hydrogen fluoride with cathode active material are effectively prevented, the dissolution of the metal in the cathode active material is inhibited, the stability of the crystal structure in the bulk phase of the cathode active material is ensured, so that the lithium ion secondary battery containing the composite cathode active material of the present application may still maintain good power discharge capacity after proceeding multiple cycles, and the gas production of the battery at high temperature is also inhibited.

In the present application, the hydrogen fluoride barrier layer comprises a substance consisting of any one of Nb, Ba, Zr, Mn, Mg, Al and Ca or any combination thereof and any one of O, F, B and P or any combination thereof. Preferably, the hydrogen fluoride barrier layer comprises a substance as shown by the formula below:

$$M_xA_yO_z$$

wherein, x is an integer from 1 to 5, y is an integer from 0 to 6, and Z is an integer from 0 to 24, provided that at least two of y and z are not zero, and such that the sum of the valence states of the compounds of the above general formula is zero.

M is any one selected from the group consisting of Nb, Ba, Zr, Mn, Mg, Al and Ca or any combination thereof; and A is any one selected from the group consisting of F, B and P or any combination thereof.

In some embodiments of the present application, the hydrogen fluoride barrier layer comprises one of the following substances: $NbBO_4$, $BaSO_4$, $ZrP_2O_7$, $Mn_2PO_4F$, $CaSn_4(PO_4)_6$, $MgF_2$, $Nb_2O_3$, $ZrO_2$, $MnO_2$, $Nb_3(PO_4)_5$, $Nb(BO_3)_3$, $Zr(BO_3)_4$ or $Mn(BO_3)_4$, or any combination thereof.

Since a hydrogen fluoride barrier layer is added between the core layer and the physical barrier layer, and the hydrogen fluoride barrier layer contains elements Nb, Ba, Zr, Mn, Mg, Al or Ca that may effectively improve the conductivity, the composite cathode active material of the present application may effectively improve the conductive property while providing a physical barrier to effectively prevent the contacting of the hydrogen fluoride with the cathode active material, thus the problem that the impedance of the composite cathode active material is increased in the prior art is overcame. The composite cathode active material of the present invention may not only maintain the good power discharge capacity of the battery, but also effectively inhibit the impedance growth of the battery.

In some embodiments of the present application, the hydrogen fluoride barrier layer comprises a substance consisting of any one of Nb, Zr, Mg, Al and Mn or any combination thereof and any one of O, F, B and P or any combination thereof. By using the hydrogen fluoride barrier layer containing the above elements, the hydrogen fluoride barrier layer of the present application may more effectively inhibit the impedance growth of the battery.

Preferably, the hydrogen fluoride barrier layer comprises one of the following substances: $NbBO_4$, $BaSO_4$, $ZrP_2O_7$, $Mn_2PO_4F$, $CaSn_4(PO_4)_6$, $Zr(BO_3)_4$ and $MgF_2$, or any combination thereof. In a further preferred embodiment, the hydrogen fluoride barrier layer comprises one the following substances: $NbBO_4$, $MgF_2$ and $Mn_2PO_4F$, or any combination thereof.

In a further embodiment of the present application, based on 100 parts by weight of the core layer, the amount of the hydrogen fluoride barrier layer is in the range of about 0.02 to about 10 parts by weight, preferably the amount of the hydrogen fluoride barrier layer is in the range of about 5 to about 10 parts by weight. When the hydrogen fluoride barrier layer is less than about 0.02 parts by weight, the thickness of the formed layer is too small to effectively block the penetration of the hydrogen fluoride. When the hydrogen fluoride barrier layer is greater than about 10 parts by weight, the thickness of the formed layer is too large, which reduces the embedding and disembedding efficiency of the free lithium ions in the electrolyte, and then adversely reduces the capacity of the lithium ion secondary battery.

In some embodiments of the present invention, for different examples, the lower limit of the amount of the hydrogen fluoride barrier layer, based on about 100 parts by weight of the core layer, may be about 0.02 parts by weight, about 0.03 parts by weight, about 0.04 parts by weight, about 0.05 parts by weight, about 0.06 parts by weight, about 0.07 parts by weight, about 0.08 parts by weight, about 0.09 parts by weight, about 0.1 parts by weight, about 0.15 parts by weight, about 0.2 parts by weight, 0.25 parts by weight, about 0.3 parts by weight, about 0.35 parts by weight, about 0.4 parts by weight, about 0.45 parts by weight, about 0.5 parts by weight, about 0.55 parts by weight, about 0.6 parts by weight, about 0.65 parts by weight, about 0.7 parts by weight, about 0.75 parts by weight, about 0.8 parts by weight, about 0.85 parts by weight, about 0.9 parts by weight, about 0.95 parts by weight, about 1 part by weight, about 1.5 parts by weight, about 2 parts by weight, about 2.5 parts by weight, about 3 parts by weight, about 3.5 parts by weight, about 4 parts by weight, about 4.5 parts by weight, or about 5 parts by weight, moreover, the upper limit of the amount of the hydrogen fluoride barrier layer, based on 100 parts by weight of the core layer, may be about 10 parts by weight, about 9.5 parts by weight, about 9 parts by weight, about 8.5 parts by weight, about 8 parts by weight, about 7.5 parts by weight, about 7 parts by weight, about 6.5 parts by weight, about 6 parts by weight, or about 5.5 parts by weight.

Specifically, based on 100 parts by weight of the core layer, the amount of the hydrogen fluoride barrier layer may be in the following range: about 0.02 parts by weight to about 10 parts by weight, about 0.05 parts by weight to about 10 parts by weight, about 0.1 parts by weight to about 10 parts by weight, about 0.2 parts by weight to about 10 parts by weight, about 0.5 parts by weight to about 10 parts by weight, about 1 part by weight to about 10 parts by weight, about 2 parts by weight to about 10 parts by weight, about 3 parts by weight to about 10 parts by weight, about 4 parts by weight to about 10 parts by weight, about 5 parts by weight to about 10 parts by weight, about 0.5 parts by weight to about 9.5 parts by weight, about 0.5 parts by weight to about 9 parts by weight, about 0.5 parts by weight to about 8.5 parts by weight, about 0.5 parts by weight to about 8 parts by weight, about 1 part by weight to about 9 parts by weight, about 1 part by weight to about 8 parts by weight, about 1 part by weight to about 7 parts by weight, about 1 part by weight to about 6 parts by weight, about 2 parts by weight to about 9.5 parts by weight, about 2 parts by weight to about 9 parts by weight, about 2 parts by weight to about 8 parts by weight, about 2 parts by weight to about 7 parts by weight, about 2 parts by weight to about 6 parts by weight, about 2 parts by weight to about 5.5 parts by weight, about 3 parts by weight to about 9.5 parts by weight, about 3 parts by weight to about 9 parts by weight, about 3 parts by weight to about 8 parts by weight, about 3 parts by weight to about 7 parts by weight, about 3 parts by weight to about 6 parts by weight, about 3 parts by weight to about 5.5 parts by weight, about 4 parts by weight to about 9.5 parts by weight, about 4 parts by weight to about 9 parts by weight, about 4 parts by weight to about 8 parts by weight, about 4 parts by weight to about 7 parts by weight, about 4 parts by weight to about 6 parts by weight, or about 4 parts by weight to about 5.5 parts by weight.

In a further embodiment of the present invention, the thickness of the hydrogen fluoride barrier layer is in the range of about 1 to about 500 nm, preferably the thickness of the hydrogen fluoride barrier layer is in the range of about 50 to about 500 nm, more preferably the thickness of the hydrogen fluoride barrier layer is in the range of about 250 to about 500 nm. For different examples, the lower limit of the thickness of the hydrogen fluoride barrier layer may be about 1 nm, about 1.5 nm, about 2 nm, about 2.5 nm, about 3 nm, about 3.5 nm, about 4 nm, about 4.5 nm, about 5 nm, about 7.5 nm, about 10 nm, about 12.5 nm, about 15 nm, about 17.5 nm, about 20 nm, about 22.5 nm, about 25 nm, about 27.5 nm, about 30 nm, about 32.5 nm, about 37.5 nm, about 40 nm, about 42.5 nm, about 45 nm, about 47.5 nm, about 50 nm, about 75 nm, about 100 nm, about 125 nm, about 150 nm, about 175 nm, about 200 nm, about 225 nm, or about 250 nm, and the upper limit thereof may be about 500 nm, about 475 nm, about 450 nm, about 425 nm, about 400 nm, about 375 nm, about 350 nm, about 325 nm, about 300 nm, or about 275 nm.

Specifically, the thickness of the hydrogen fluoride barrier layer may be in the following range: about 1 nm to about 500 nm, about 2.5 nm to about 500 nm, about 5 nm to about 500 nm, about 10 nm to about 500 nm, about 25 nm to 500 nm, about 50 nm to about 500 nm, about 100 nm to about 500 nm, about 150 nm to about 500 nm, about 200 nm to about 500 nm, about 250 nm to about 500 nm, about 25 nm to about 475 nm, about 25 nm to about 450 nm, about 25 nm to about 425 nm, about 25 nm to about 400 nm, about 50 nm to about 450 nm, about 50 nm to about 400 nm, about 50 nm to about 350 nm, about 50 nm to about 300 nm, about 100 nm to about 475 nm, about 100 nm to about 450 nm, about 100 nm to about 400 nm, about 100 nm to about 350 nm, about 100 nm to about 300 nm, about 100 nm to about 275 nm, about 150 nm to about 475 nm, about 150 nm to about 450 nm, about 150 nm to about 400 nm, about 150 nm to about 350 nm, about 150 nm to about 300 nm, about 150 nm to about 275 nm, about 200 nm to about 475 nm, about 200 nm to about 450 nm, about 200 nm to about 400 nm, about 200 nm to about 350 nm, about 200 nm to about 300 nm, or about 200 nm to about 275 nm.

In some embodiments of the present application, the physical barrier layer comprises a substance consisting of any one of Ta, W, Hf, Zr, Nb, Sc, Zn and Al or any combination thereof and any one of O and P or any combination thereof. Since the above elements are included in the physical barrier layer of the present invention, the formed physical barrier layer has a denser structure. By using such structure, the lithium ions in the electrolyte may effectively pass through the physical barrier layer so as to be embedded and disembedded on the cathode active material, but the hydrogen fluoride in the electrolyte may not pass through the dense physical barrier layer, so that the corrosion of hydrogen fluoride to the cathode active material may be effectively prevented.

In some embodiments of the present application, the physical barrier layer comprises a substance as shown by the formula below:

$$M'_xP_yO_z$$

wherein, x is an integer from 1 to 3, y is an integer from 0 to 5, and Z is an integer from 0 to 20, provided that y and z are not both zero, and such that the sum of the valence states of the compounds of the above general formula is zero.

M' is any one selected from the group consisting of Ta, W, Hf, Zr, Nb, Sc, Zn and Al, or any combination thereof.

In some embodiments of the present application, the hydrogen fluoride barrier layer comprises one of the following substances: $Ta_3(PO_4)_5$, $Nb_3(PO_4)_5$, $W(PO_4)_2$, $Zr_3(PO_4)_4$, $ZrO_2$, $Al_2O_3$, ZnO, $AlPO_4$, $NbO_2$, $WO_3$ and $Ta_2O_5$, or any combination thereof.

In some preferred embodiments, the physical barrier layer comprises a substance consisting of any one of Ta, W, Zr, Nb, Sc, Zn and Al or any combination thereof and any one of O and P or any combination thereof.

In preferred embodiments, M' is any one selected from the group consisting of Ta, Nb, W, Zr and Al, or any combination thereof.

In some embodiments of the present application, the physical barrier layer comprises one of the following substances: $W(PO_4)_2$, $Zr_3(PO_4)_4$, $ZrO_2$, $Al_2O_3$, ZnO, $AlPO_4$, $NbO_2$, $WO_3$ and $Ta_2O_5$, or any combination thereof. In more preferred embodiments, the physical barrier layer comprises one of the following substances: $W(PO_4)_2$, $Zr_3(PO_4)_4$, $Al_2O_3$, $ZrO_2$, and $AlPO_4$, or any combination thereof.

In a further embodiment of the present application, based on 100 parts by weight of the core layer, the amount of the physical barrier layer is in the range of about 0.02 to about 5 parts by weight, preferably the amount of the physical barrier layer is in the range of about 0.02 to about 2.5 parts by weight. When the amount of physical barrier layer is less than about 0.02 parts by weight, the formed physical barrier layer may not form a dense structure, so that the hydrogen fluoride in the electrolyte may penetrate through the physical barrier layer, and thus may not effectively isolate the hydrogen fluoride from the cathode active material. When the amount of the physical barrier layer is greater than about 5 parts by weight, the thickness of the formed physical barrier layer is too large, resulting in an unfavorable increasing of impedance, and because the formed physical barrier layer has an excessively dense structure, lithium ions may not be effectively embedded and disembedded, and the capacity of lithium ion secondary battery will be adversely reduced.

In some embodiments of the present invention, for different examples, the lower limit of the amount of the physical barrier layer, based on 100 parts by weight of the core layer, may be about 0.02 parts by weight, about 0.03 parts by weight, about 0.04 parts by weight, about 0.05 parts by weight, about 0.06 parts by weight, about 0.07 parts by weight, about 0.08 parts by weight, about 0.09 parts by weight, about 0.1 parts by weight, about 0.15 parts by weight, about 0.2 parts by weight, about 0.25 parts by weight, about 0.3 parts by weight, about 0.35 parts by weight, about 0.4 parts by weight, about 0.45 parts by weight, about 0.5 parts by weight, about 0.55 parts by weight, about 0.6 parts by weight, about 0.65 parts by weight, about 0.7 parts by weight, about 0.75 parts by weight, about 0.8 parts by weight, about 0.85 parts by weight, about 0.9 parts by weight, about 0.95 parts by weight, about 1 part by weight, about 1.5 parts by weight, about 2 parts by weight, or about 2.5 parts by weight, moreover, the upper limit of the amount of the physical barrier layer, based on 100 parts by weight of the core layer, may be about 2.6 parts by weight, about 2.7 parts by weight, about 2.8 parts by weight, about 2.9 parts by weight, about 3 parts by weight, about 3.5 parts by weight, about 4 parts by weight, about 4.5 parts by weight, or about 5 parts by weight.

Specifically, based on 100 parts by weight of the core layer, the amount of the physical barrier layer may be in the following range: about 0.02 parts by weight to about 5 parts by weight, about 0.02 parts by weight to about 4.5 parts by weight, about 0.02 parts by weight to about 4 parts by weight, about 0.02 parts by weight to about 3.5 parts by weight, about 0.02 parts by weight to about 3 parts by weight, about 0.02 parts by weight to about 2.6 parts by weight, about 0.1 parts by weight to about 5 parts by weight, about 0.1 parts by weight to about 4.5 parts by weight, about 0.1 parts by weight to about 4 parts by weight, about 0.1 parts by weight to about 3.5 parts by weight, about 0.1 parts by weight to about 3 parts by weight, about 0.1 parts by weight to about 2.6 parts by weight, about 0.5 parts by weight to about 5 parts by weight, about 0.5 parts by weight to about 4.5 parts by weight, about 0.5 parts by weight to about 4 parts by weight, about 0.5 parts by weight to about 3.5 parts by weight, about 0.5 parts by weight to about 3 parts by weight, about 0.5 parts by weight to about 2.6 parts by weight, about 1 part by weight to about 5 parts by weight, about 1 part by weight to about 4.5 parts by weight, about 1 part by weight to about 4 parts by weight, about 1 part by weight to about 3.5 parts by weight, about 1 part by weight to about 3 parts by weight, about 1 part by weight to about 2.6 parts by weight, about 2 parts by weight to about 5 parts by weight, about 2 parts by weight to about 4.5 parts by weight, about 2 parts by weight to about 4 parts by weight, about 2 parts by weight to about 3.5 parts by weight, about 2 parts by weight to about 3 parts by weight, about 2 parts by weight to about 2.6 parts by weight, about 2.5 parts by weight to about 5 parts by weight, about 2.5 parts by weight to about 4.5 parts by weight, about 2.5 parts by weight to about 4 parts by weight, about 2.5 parts by weight to about 3.5 parts by weight, about 2.5 parts by weight to about 3 parts by weight, or about 2.5 parts by weight to about 2.6 parts by weight.

In a further embodiment of the present invention, the thickness of the physical barrier layer is in the range of about 1 to about 250 nm, preferably the thickness of the physical barrier layer is in the range of about 1 to about 125 nm, more preferably the thickness of the physical barrier layer is in the range of about 25 to about 125 nm. For different examples, the lower limit of the thickness of the physical barrier layer may be about 1 nm, about 1.5 nm, about 2.5 nm, about 3 nm, about 3.5 nm, about 4 nm, about 4.5 nm, about 5 nm, about 7.5 nm, about 10 nm, about 12.5 nm, about 15 nm, about 17.5 nm, about 20 nm, about 22.5 nm, about 25 nm, about 27.5 nm, about 30 nm, about 32.5 nm, about 35 nm, about 37.5 nm, about 40 nm, about 42.5 nm, about 45 nm, about 47.5 nm, about 50 nm, about 100 nm, or about 125 nm, and the upper limit thereof may be about 250 nm, about 225 nm, about 200 nm, about 175 nm, about 150 nm, about 145 nm, about 140 nm, about 135 nm, or about 130 nm.

Specifically, the thickness of the physical barrier layer may be in the following range: about 1 nm to about 250 nm, about 1 nm to about 225 nm, about 1 nm to about 200 nm, about 1 nm to about 175 nm, about 1 nm to about 150 nm, about 1 nm to about 130 nm, about 5 nm to about 250 nm, about 5 nm to about 225 nm, about 5 nm to about 200 nm, about 5 nm to about 175 nm, about 5 nm to about 150 nm, about 5 nm to about 130 nm, about 25 nm to about 250 nm, about 25 nm to about 225 nm, about 25 nm to about 200 nm, about 25 nm to about 175 nm, about 25 nm to about 150 nm, about 25 nm to about 130 nm, about 50 nm to about 250 nm, about 50 nm to about 225 nm, about 50 nm to about 200 nm, about 50 nm to about 175 nm, about 50 nm to about 150 nm, about 50 nm to about 130 nm, about 100 nm to about 250 nm, about 100 nm to about 225 nm, about 100 nm to about 200 nm, about 100 nm to about 175 nm, about 100 nm to about 150 nm, about 100 nm to about 130 nm, about 125 nm to about 250 nm, about 125 nm to about 225 nm, about 125 nm to about 200 nm, about 125 nm to about 175 nm, about 125 nm to about 150 nm, or about 125 nm to about 130 nm.

In some embodiments of the present invention, the cathode active material contained in the core layer comprises any one of composite lithium cobalt oxide with a general formula of $LiCo_{1-\alpha}M_{\alpha}O_2$, lithium nickel-cobalt manganate with a general formula of $LiNi_{1-x-y}Co_xAl_yO_2$ and lithium nickel-cobalt aluminate with a general formula of $LiNi_{1-x-y}Co_xAl_yO_2$ or any combination thereof, wherein $0<\alpha\leq0.2$, $0\leq x\leq1$, $0\leq y\leq1$ and $0\leq x+y\leq1$, M is selected from any one of alkaline earth metal elements and transition metal elements or any combination thereof, so that the sum of the valence states of the compounds of the above general formula is zero. In some preferred embodiments, M in the general formula $LiCo_{1-\alpha}M_{\alpha}O_2$ is one or more of Mg, Sc, Ti, Fe, Ni, Cu, Zn, Ga, Zr, Nb, Mo, Ru, Rh, Pd, In, Sn, Hf, Ta, W, Re, Cr, Y, Sb, Lu, Au, Pb, Er, Na, Al, Si, Ge, Mn, Ca, Te, Hg, Bi, La, Ce, Pr, Nd, Sm, and V.

In some embodiments of the present invention, the composite cathode active material further comprises a sacrificial layer arranged between the core layer and the hydrogen fluoride barrier layer. The sacrificial layer may react with hydrogen fluoride as follows:

$$HF+MO\rightarrow MF+H_2O\text{; and}$$

$$HF+M\rightarrow MF+H_2$$

Thus, in case of the hydrogen fluoride penetrates through the physical barrier layer and the hydrogen fluoride barrier layer, the sacrificial layer may provide further protection for the cathode active material. In the present invention, the sacrificial layer may include any material with Gibbs free energy $G_{s\text{-}HF}<0$ for reacting with hydrogen fluoride, so as to ensure that the reaction may occur when the sacrificial layer is in contact with hydrogen fluoride, thereby consuming the hydrogen fluoride penetrating through the physical barrier layer and the hydrogen fluoride barrier layer.

In some embodiments of the present invention, the sacrificial layer comprises a substance consisting of any one of Ti, Al, Mg, Zr, Sr, Zn, W and Sc or any combination thereof and any one of O, F and B or any combination thereof; preferably, the sacrificial layer comprises a substance as shown by the formula below:

$$M''_xA'_yO_z$$

wherein, x is an integer from 1 to 3, y is an integer from 0 to 4, and Z is an integer from 0 to 12, provided that y and z are not both zero, and such that the sum of the valence states of the compounds of the above general formula is zero.

M" is any one selected from the group consisting of Ti, Al, Mg, Zr, Sr, Zn, W and Sc or any combination thereof, and A' is any one selected from the group consisting of F and B or any combination thereof.

In some embodiments of the present application, the sacrificial layer comprises one of the following substances: $Ti(BO_3)_4$, $Al(BO_3)_3$, $Zr(BO_3)_4$, $SrB_4O_7$, $Zn(BO_3)_2$, $Sc(BO_3)_3$, $Mg(BO_3)_2$, $Sr_2Mg(BO_3)_4$, $TaBO_4$, $AlF_3$, ZnO, $Sc_2O_3$, $TiO_2$, $Al_2O_3$, MgO, $ZrO_2$, $SrO_2$ and $MgF_2$, or any combination thereof.

In a further preferred embodiment, the sacrificial layer comprises a substance consisting of any one of Ti, Al, W, Zr and Mg or any combination thereof and any one of O and B or any combination thereof.

In preferred embodiments, M" is any one selected from the group consisting of Ti, Al, W and Mg, or any combination thereof.

In a more preferred embodiment, the sacrificial layer comprises one of the following substances: $Ti(BO_3)_4$, $Al(BO_3)_3$, $SrB_4O_7$, $TiO_2$, $Al_2O_3$, MgO, $ZrO_2$ and $MgF_2$, or any combination thereof.

In a further embodiment of the present application, based on 100 parts by weight of the core layer, the amount of the sacrificial layer is in the range of about 0.02 to about 5 parts by weight, preferably the amount of the sacrificial layer is in the range of about 2.5 to about 5 parts by weight. When the amount of the sacrificial layer is less than about 0.02 parts by weight, the thickness of the formed layer is too small to effectively consume the infiltrated hydrogen fluoride, making the hydrogen fluoride be in contact with the cathode active material of the core layer, which adversely affects the capacity and cycle retention rate of the lithium ion secondary battery. When the amount of the sacrificial layer is greater than about 10 parts by weight, the thickness of the formed layer is too large, resulting in an unfavorable increase in impedance and the capacity of the lithium ion secondary battery will be adversely reduced.

In some embodiments of the present invention, for different examples, based on 100 parts by weight of the core layer, the lower limit of the sacrificial layer may be about 0.02 parts by weight, about 0.03 parts by weight, about 0.04 parts by weight, about 0.05 parts by weight, about 0.06 parts by weight, about 0.07 parts by weight, about 0.08 parts by weight, about 0.09 parts by weight, about 0.1 parts by weight, about 0.15 parts by weight, about 0.2 parts by weight, about 0.25 parts by weight, about 0.3 parts by weight, about 0.35 parts by weight, about 0.4 parts by weight, about 0.45 parts by weight, about 0.5 parts by weight, about 0.55 parts by weight, about 0.6 parts by weight, about 0.65 parts by weight, about 0.7 parts by weight, about 0.75 parts by weight, about 0.8 parts by weight, about 0.85 parts by weight, about 0.9 parts by weight, about 0.95 parts by weight, about 1 part by weight, about 1.5 parts by weight, about 2 parts by weight, or about 2.5 parts by weight, moreover, the upper limit of the sacrificial layer, based on 100 parts by weight of the core layer, may be about 2.6 parts by weight, about 2.7 parts by weight, about 2.8 parts by weight, about 2.9 parts by weight, about 3 parts by weight, about 3.5 parts by weight, about 4 parts by weight, about 4.5 parts by weight, or about 5 parts by weight.

Specifically, based on 100 parts by weight of the core layer, the amount of the sacrificial layer may be in the following range: about 0.02 parts by weight to about 5 parts by weight, about 0.02 parts by weight to about 4.5 parts by weight, about 0.02 parts by weight to about 4 parts by weight, about 0.02 parts by weight to about 3.5 parts by weight, about 0.02 parts by weight to about 3 parts by weight, about 0.02 parts by weight to about 2.6 parts by weight, about 0.1 parts by weight to about 5 parts by weight, about 0.1 parts by weight to about 4.5 parts by weight, about 0.1 parts by weight to about 4 parts by weight, about 0.1 parts by weight to about 3.5 parts by weight, about 0.1 parts by weight to about 3 parts by weight, about 0.1 parts by weight to about 2.6 parts by weight, about 0.5 parts by weight to about 5 parts by weight, about 0.5 parts by weight to about 4.5 parts by weight, about 0.5 parts by weight to about 4 parts by weight, about 0.5 parts by weight to about 3.5 parts by weight, about 0.5 parts by weight to about 3 parts by weight, about 0.5 parts by weight to about 2.6 parts by weight, about 1 part by weight to about 5 parts by weight, about 1 part by weight to about 4.5 parts by weight, about 1 part by weight to about 4 parts by weight, about 1 part by weight to about 3.5 parts by weight, about 1 part by weight to about 3 parts by weight, about 1 part by weight to about 2.6 parts by weight, about 2 parts by weight to about 5 parts by weight, about 2 parts by weight to about 4.5 parts by weight, about 2 parts by weight to about 4 parts by weight, about 2 parts by weight to about 3.5 parts by weight, about 2 parts by weight to about 3 parts by weight, about 2 parts by weight to about 2.6 parts by weight, about 2.5 parts by weight to about 5 parts by weight, about 2.5 parts by weight to about 4.5 parts by weight, about 2.5 parts by weight to about 4 parts by weight, about 2.5 parts by weight to about 3.5 parts by weight, about 2.5 parts by weight to about 3 parts by weight, or about 2.5 parts by weight to about 2.6 parts by weight.

In a further embodiment of the present invention, the thickness of the sacrificial layer is in the range of about 1 to about 250 nm, preferably the thickness of the sacrificial layer is in the range of about 25 to about 250 nm, more preferably the thickness of the sacrificial layer is in the range of about 125 to about 250 nm. For different examples, the lower limit of the thickness of the sacrificial layer may be about 1 nm, about 1.5 nm, about 2.5 nm, about 3 nm, about 3.5 nm, about 4 nm, about 4.5 nm, about 5 nm, about 7.5 nm, about 10 nm, about 12.5 nm, about 15 nm, about 17.5 nm, about 20 nm, about 22.5 nm, about 25 nm, about 27.5 nm, about 30 nm, about 32.5 nm, about 35 nm, about 37.5 nm, about 40 nm, about 42.5 nm, about 45 nm, about 47.5 nm, about 50 nm, about 100 nm, about 125 nm, and the upper limit thereof may be about 250 nm, about 225 nm, about 200 nm, about 175 nm, about 150 nm, about 145 nm, about 140 nm, about 135 nm, or about 130 nm.

Specifically, the thickness of the sacrificial layer may be in the following range: about 1 nm to about 250 nm, about 1 nm to about 225 nm, about 1 nm to about 200 nm, about 1 nm to about 175 nm, about 1 nm to about 150 nm, about 1 nm to about 130 nm, about 5 nm to about 250 nm, about 5 nm to about 225 nm, about 5 nm to about 200 nm, about 5 nm to about 175 nm, about 5 nm to about 150 nm, about 5 nm to about 130 nm, about 25 nm to about 250 nm, about 25 nm to about 225 nm, about 25 nm to about 200 nm, about 25 nm to about 175 nm, about 25 nm to about 150 nm, about 25 nm to about 130 nm, about 50 nm to about 250 nm, about 50 nm to about 225 nm, about 50 nm to about 200 nm, about 50 nm to about 175 nm, about 50 nm to about 150 nm, about 50 nm to about 130 nm, about 100 nm to about 250 nm, about 100 nm to about 225 nm, about 100 nm to about 200 nm, about 100 nm to about 175 nm, about 100 nm to about 150 nm, about 100 nm to about 130 nm, about 125 nm to about 250 nm, about 125 nm to about 225 nm, about 125 nm to about 200 nm, about 125 nm to about 175 nm, about 125 nm to about 150 nm, or about 125 nm to about 130 nm.

According to another typical embodiment of the present invention, a method for preparing a composite cathode active material is provided. The method comprises the following steps: step S1-1, mixing the hydrogen fluoride barrier layer precursor material and the active material particles to obtain a first mixture, calcining the first mixture in the temperature range of about 250° C. to about 350° C. for about 2 to about 4 hours, crushing the calcined product and sieving with 200 to 400 mesh sieve to obtain the hydrogen fluoride barrier layer coating product, the hydrogen fluoride barrier layer precursor material comprising any one of elementary substance of Nb, Ba, Zr, Mn, Ca, Mg, Al and their oxides, fluorides, borates, sulfates and phosphates or any combination thereof; and step S2-1, mixing the physical barrier layer precursor material and the hydrogen fluoride barrier layer coating product to obtain a second mixture, calcining the second mixture in the temperature range of about 500° C. to about 600° C. for about 2 to about 4 hours, crushing the calcined product and sieving with 200 to 400 mesh sieve to obtain the composite cathode active material.

The cathode active material prepared by the present method comprises a three-layer structure: a core layer, a physical barrier layer and a hydrogen fluoride barrier layer. Since it is calcined for about 2 to about 4 hours in the temperature range of about 500° C. to about 600° C., the physical barrier layer has a dense structure, so as to effectively prevent the penetration of hydrogen fluoride. The hydrogen fluoride barrier layer is formed by sintering the precursor materials of any one of elementary substance of Nb, Ba, Zr, Mn, Ca, Mg and Al and their oxides, fluorides, borates, sulfates and phosphates, or any combination thereof. Therefore, the composite cathode active material prepared by the method of the present application effectively prevents the contacting of the hydrogen fluoride with the cathode active material, while overcoming the problem of increasing the impedance of the composite cathode active material in the prior art. Therefore, it may not only maintain the good power discharge capacity of the battery, but also effectively inhibit the impedance growth of the battery. In a preferred embodiment, the hydrogen fluoride barrier precursor material comprises any one of elementary substance of Nb, Mg, Zr, Mn and Al and their oxides, fluorides, borates, sulfates and phosphates, or any combination thereof.

According to another typical embodiment of the present invention, a method for preparing a composite cathode active material is provided. The method comprises: step S1-2, mixing the sacrificial layer precursor material and the active material particles to obtain a first mixture, calcining the first mixture in the temperature range of about 250° C. to about 350° C. for about 2 to about 4 hours, crushing the calcined product and sieving with 200 to 400 mesh sieve to obtain the first coating product, the sacrificial layer precursor material comprising any one of elementary substance of Ti, Al, Mg, Zr, Sr, Zn, Sc, W and their oxides, fluorides, and borates or any combination thereof; step S2-2, mixing the hydrogen fluoride barrier layer precursor material and the first coating product to obtain a second mixture, calcining the second mixture in the temperature range of about 250° C. to about 350° C. for about 2 to about 4 hours, crushing the calcined product and sieving with 200 to 400 mesh sieve to obtain a second coating product, the hydrogen fluoride barrier layer precursor material comprising any one of elementary substance of Nb, Ba, Zr, Mn, Ca, Mg, Al and their oxides, fluorides, borates, sulfates and phosphates or any combination thereof; and step S3-2, mixing the physical barrier layer precursor material and the second coating product to obtain a third mixture, calcining the third mixture in the temperature range of about 500° C. to about 600° C. for about 2 to about 4 hours, crushing the calcined product and sieving with 200 to 400 mesh sieve to obtain the composite cathode active material. In a preferred embodiment, the sacrificial layer precursor material comprises any one of elementary substance of Ti, Al, Mg, Zr, and W and their oxides, fluorides, and borates, or any combination thereof, and the hydrogen fluoride barrier precursor material comprises any one of elementary substance of Nb, Mg, Zr, Mn and Al and their oxides, fluorides, borates, sulfates and phosphates, or any combination thereof.

The cathode active material prepared by the present method comprises a four-layer structure: a core layer, a sacrificial layer, a physical barrier layer and a hydrogen fluoride barrier layer. The sacrificial layer is prepared from a sacrificial layer precursor material containing any one of elementary substance of Ti, Al, Mg, Zr, Sr, Zn, Sc and W and their oxides, fluorides and borates, or any combination thereof. Therefore, the sacrificial layer may react with hydrogen fluoride before the hydrogen fluoride is in contact with and reacts with the cathode active material in the core layer, avoiding the corrosion of hydrogen fluoride to the cathode active material. Since it is calcined for about 2 to about 4 hours in the temperature range of about 500° C. to about 600° C., the physical barrier layer has a dense structure, so as to effectively prevent the penetration of hydrogen fluoride. The hydrogen fluoride barrier layer is formed by sintering the precursor materials of any one of elementary substance of Nb, Ba, Zr, Mn, Ca, Mg and Al and their oxides, fluorides, borates, sulfates and phosphates, or any combination thereof. Therefore, the composite cathode active material prepared by the method of the present application effectively prevents the contacting of the hydrogen fluoride with the cathode active material, while overcoming the problem of increasing the impedance of the composite cathode active material in the prior art. Therefore, it may not only maintain the good power discharge capacity of the battery, but also effectively inhibit the impedance growth of the battery.

In some embodiments of the present application, the sacrificial layer precursor material includes but is not limited to any of the following: elementary substance of Ti, Al, Mg, Zr, Sr, Zn, and Sc, and MgO, $ZrO_2$, $Mg(BO_3)_2$, $AlF_3$, $Sr_2Mg(BO_3)_4$, $TaBO_4$, ZnO, $Sc_2O_3$, $Ti(BO_3)_4$, $Al(BO_3)_3$, $TiO_2$, $Al_2O_3$, MgO and $MgF_2$, or any combination thereof. In a preferred embodiment, the sacrificial layer precursor material includes but is not limited to any of the following: elementary substance of Ti, Al, Mg, Zr, and W, and MgO, $ZrO_2$, $Mg(BO_3)_2$, $AlF_3$ and $Al_2O_3$, or any combination thereof. In a more preferred embodiment, the sacrificial layer precursor material includes but is not limited to any of the following: elementary substance of Ti, Al, and W, and MgO, $ZrO_2$, $Mg(BO_3)_2$ and $Al_2O_3$, or any combination thereof.

In some embodiments of the present application, the hydrogen fluoride barrier layer precursor material includes but is not limited to any of the following: elementary substance of Nb, Ba, Zr, Mn, and Ca, and $NbBO_4$, $BaSO_4$, $ZrP_2O_7$, $Mn_2PO_4F$, $CaSn_4(PO_4)_6$, $MgF_2$, $NbO_2$, $ZrO_2$ and $MnO_2$, or any combination thereof. In a preferred embodiment, the hydrogen fluoride barrier layer precursor material includes but is not limited to any of the following: elementary substance of Nb, Mg, Zr, Mn, and Al, and $MgF_2$, $NbBO_4$, $Mn_2PO_4F$, $ZrP_2O_7$, $Al_2O_3$, MgO, $ZrO_2$, and $Mg(BO_3)_2$, or any combination thereof. In a more preferred embodiment, the hydrogen fluoride barrier layer precursor material includes but is not limited to any of the following: elementary substance of Nb, and $MgF_2$, $NbBO_4$ and $Mn_2PO_4F$, or any combination thereof.

In some embodiments of the present application, the sacrificial layer precursor material includes a first sacrificial layer precursor substance, a second sacrificial layer precursor substance and an optional third sacrificial layer precursor substance, which are different from each other, and wherein, the amount of the first sacrificial layer precursor substance and the amount of the second sacrificial layer precursor substance are in the range of about 20 to about 70 parts by weight, respectively, and the amount of the optional third sacrificial layer precursor substance is in the range of about 0 to about 50 parts by weight, so that the first sacrificial layer precursor substance, the second sacrificial layer precursor substance and the optional third sacrificial layer precursor substance constitute 100 parts by weight of the sacrificial layer precursor material.

In a preferred embodiment, the hydrogen fluoride barrier layer precursor material includes only one hydrogen fluoride barrier layer precursor material. In another preferred embodiment, the hydrogen fluoride barrier layer precursor material includes a first hydrogen fluoride barrier layer precursor substance and a second hydrogen fluoride barrier layer precursor substance, and wherein, the amount of the first hydrogen fluoride barrier layer precursor substance and the amount of the second hydrogen fluoride barrier layer precursor substance are in the range of about 30 to about 70 parts by weight, so that the first hydrogen fluoride barrier layer precursor substance and the second hydrogen fluoride barrier layer precursor substance constitute 100 parts by weight of the hydrogen fluoride barrier layer precursor material.

In some embodiments of the present application, the physical barrier layer precursor material includes any one of elementary substance of Ta, W, Hf, Zr, Nb, Sc, Zn and Al, and their oxides and phosphates or any combination thereof; preferably, the physical barrier layer precursor material comprises a first physical barrier layer precursor substance, a second physical barrier layer precursor substance and an optional third physical barrier layer precursor substance, wherein the first physical barrier layer precursor substance, the second physical barrier layer precursor substance and the optional third physical barrier layer precursor substance are different from each other.

In some embodiments of the present application, the physical barrier layer precursor material includes but is not limited to any of the following: elementary substance of Ta, W, Hf, Zr, Nb, Sc, Zn, and Al, and $Al_2O_3$, $ZrO_2$, $AlPO_4$, $W(PO_4)_2$, $Zr_3(PO_4)_4$, ZnO, $NbO_2$, $WO_3$ and $Ta_2O_5$, or any combination thereof. In some embodiments of the present application, the physical barrier layer precursor material includes but is not limited to any of the following: elementary substance of W, Zr, Al, Sc, Nb, Zn, and Ta, and $Al_2O_3$, $ZrO_2$, and $AlPO_4$, or any combination thereof. In a more preferred embodiment, the physical barrier layer precursor material includes but is not limited to any of the following: elementary substance of W, Zr and Sc, and $Al_2O_3$, $ZrO_2$ and $AlPO_4$, or any combination thereof.

In some preferred embodiments of the present application, the physical barrier layer precursor material includes a first physical barrier layer precursor substance, and a second physical barrier layer precursor substance, and wherein, the amount of the first physical barrier layer precursor substance and the amount of the second physical barrier layer precursor substance are in the range of about 20 to about 70 parts by weight, respectively, and the amount of the optional third physical barrier layer precursor substance is in the range of about 0 to about 50 parts by weight, so that the first physical barrier layer precursor substance, the second physical barrier layer precursor substance and the optional third physical barrier layer precursor substance constitute 100 parts by weight of the physical barrier layer precursor material.

According to another typical embodiment of the present invention, a cathode sheet of a lithium ion secondary battery is provided. The cathode sheet comprises a composite cathode active material of the present invention. Since the composite cathode active material of the present invention is included, the cathode sheet of the lithium ion secondary battery of the present invention may effectively prevent the contacting and reacting of the hydrogen fluoride with cathode active material, inhibit the dissolution of the metal in the cathode active material, and ensure the stability of the crystal structure in the bulk phase of the cathode active material, so that the lithium ion secondary battery containing the same may still maintain good power discharge capacity after multiple cycles, and the gas production of the battery at high temperature is also inhibited.

According to another typical embodiment of the present invention, a lithium ion secondary battery is provided. The lithium ion secondary battery comprises a cathode sheet, an anode sheet, and a separator, wherein the cathode sheet comprises the composite cathode active material of the present invention. Where the composite cathode active material of the present invention is included, the lithium ion secondary battery of the present invention effectively avoids the corrosion of hydrogen fluoride to the positive material, maintains good power discharge capacity, reduces the impedance after multiple cycles, and inhibits the gas production of the battery at high temperature.

The present invention will be described in further detail below in combination with specific examples, which may not be understood as limiting the protection scope claimed by the present invention.

EXAMPLE 1

Preparation of Composite Cathode Active Material 8.4 g of the first sacrificial layer precursor substance (elementary substance Ti), 8.4 g of the second sacrificial layer precursor substance (elementary substance Al) and 8.4 g of the third sacrificial layer precursor substance (MgO) were weighed, wherein the weight ratio of the three sacrificial layer precursor materials was 1:1:1, and mixed evenly as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of the weight of the bulk phase (lithium nickel cobalt manganate). The mixed materials were placed in a roasting furnace and calcined at a temperature of about 300° C. for 2 hours. The calcined product was taken out, crushed with a crusher, and then sieved with a 200 mesh sieve to obtain the first coating product (the cathode active material coated with a sacrificial layer).

25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1050.0 g of the first coating product were added to the mixer and mixed evenly, wherein the weight of the hydrogen fluoride barrier layer precursor material was 5% (wt/wt) of the weight of the bulk phase (lithium nickel cobalt manganate). The mixed materials were placed in a roasting furnace and calcined at a temperature of about 350° C. for 2 hours. The calcined product was taken out, crushed with a crusher, and then sieved with a 200 mesh sieve to obtain the second coating product (the cathode active material coated with a sacrificial layer and a hydrogen fluoride barrier layer).

16.7 g of the first physical barrier layer precursor substance (elementary substance W), 16.7 g of the second physical barrier layer precursor substance (elementary substance Zr) and 16.7 g of the third physical barrier layer precursor substance ($Al_2O_3$) were weighed, wherein the weight ratio of the three physical barrier layer precursor materials was 1:1:1, and mixed evenly as the physical barrier layer precursor material. 50.0 g of the physical barrier layer precursor material and 1100.0 g of the second coating product were added to the mixer and mixed evenly, wherein the weight of the physical barrier layer precursor material was 5% (wt/wt) of the weight of the bulk phase. The mixed materials were placed in a roasting furnace and calcined at a temperature of about 550° C. for 2 hours. The calcined product was taken out, crushed with a crusher, and then sieved with a 200 mesh sieve to obtain the composite cathode active material.

Preparation of Lithium Ion Secondary Battery

Preparation of Cathode 92.0 g of composite cathode active material, 5.0 g of graphite conductive agent and 3.0 g of polyvinylidene fluoride binder were mixed to obtain a cathode mixture, and the obtained cathode mixture was dispersed in 33.0 g of N-methylpyrrolidone to obtain a cathode mixture slurry. Subsequently, a cathode mixture slurry was coated to the aluminum foil to obtain a cathode current collector. The cathode current collector was dried and the cathode pole piece was formed by stamping molding process.

Preparation of Anode 97.0 g of graphite powder, 2.0 g of styrene butadiene rubber and 1.0 g of carboxymethyl cellulose were added to an appropriate amount of water and stirred to form an anode slurry. Then, the obtained anode slurry was uniformly coated on the copper foil to obtain an anode current collector. The anode current collector was dried and the anode pole piece was formed by stamping molding process.

Preparation of Electrolyte 15.0 g of ethylene carbonate, 70.0 g of dimethyl carbonate and 15.0 g of lithium hexafluorophosphate were mixed to prepare the electrolyte.

Battery Assembly

CR2016 button batteries were assembled in a dry laboratory. The cathode pole piece made in the above steps was used as the positive electrode and the anode pole piece was used as the negative electrode. The positive electrode, negative electrode, separator and the battery shell of the button battery were assembled, and an electrolyte was injected therein. After the battery was assembled completely, it was allowed to stand still for about 24 hours to age, so as to obtain a lithium nickel-cobalt manganate button battery.

EXAMPLE 2

The composite cathode active material and lithium ion secondary battery were prepared in the same manner as in Example 1, except that:

8.4 g of the first sacrificial layer precursor substance (elementary substance Ti), 8.4 g of the second sacrificial layer precursor substance (elementary substance Al) and 8.4 g of the third sacrificial layer precursor substance (MgO) were weighed, wherein the weight ratio of the three sacrificial layer precursor materials was 1:1:1, and mixed evenly as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of that of the bulk phase (lithium nickel cobalt manganate).

50.0 g of the first hydrogen fluoride barrier layer precursor substance (Nb) and 50.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 100.0 g of the hydrogen fluoride barrier layer precursor material and 1025.0 g of the first coating product were added to the mixer and mixed evenly, wherein the weight of the hydrogen fluoride barrier layer precursor material was 10% (wt/wt) of that of the bulk phase (lithium nickel cobalt manganate).

8.4 g of the first physical barrier layer precursor substance (elementary substance W), 8.4 g of the second physical barrier layer precursor substance (elementary substance Zr) and 8.4 g of the third physical barrier layer precursor substance ($Al_2O_3$) were weighed, wherein the weight ratio of the three physical barrier layer precursor materials was 1:1:1, and mixed evenly as the physical barrier layer precursor material. 25.0 g of the physical barrier layer precursor material and 1125.0 g of the second coating product were added to the mixer and mixed evenly, wherein the weight of the physical barrier layer precursor material was 2.5% (wt/wt) of the weight of the bulk phase (lithium nickel cobalt manganate).

EXAMPLE 3

The composite cathode active material and lithium ion secondary battery were prepared in the same manner as in Example 1, except that:

16.7 g of the first sacrificial layer precursor substance (elementary substance Ti), 16.7 g of the second sacrificial layer precursor substance (elementary substance Al) and 16.7 g of the third sacrificial layer precursor substance (MgO) were weighed, wherein the weight ratio of the three sacrificial layer precursor materials was 1:1:1, and mixed evenly as the sacrificial layer precursor material. 50.0 g of the sacrificial layer precursor material and 1000.0 g of lithium nickel cobalt manganate were added to the mixer and mixed evenly, wherein the weight of the sacrificial layer precursor material was 5 wt % (wt/wt) of the weight of the bulk phase (lithium nickel cobalt manganate).

25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1050.0 g of the first coating product were added to the mixer and mixed evenly, wherein the weight of the hydrogen fluoride barrier layer precursor material was 5 wt % (wt/wt) of the weight of the bulk phase (lithium nickel cobalt manganate).

8.4 g of the first physical barrier layer precursor substance (elementary substance W), 8.4 g of the second physical barrier layer precursor substance (elementary substance Zr) and 8.4 g of the third physical barrier layer precursor substance ($Al_2O_3$) were weighed, wherein the weight ratio of the three physical barrier layer precursor materials was 1:1:1, and mixed evenly as the physical barrier layer precursor material. 25.0 g of the physical barrier layer precursor material and 1100.0 g of the second coating product were added to the mixer and mixed evenly, wherein the weight of the physical barrier layer precursor material was 2.5% (wt/wt) of the weight of the bulk phase (lithium nickel cobalt manganate).

EXAMPLE 4

The composite cathode active material and lithium ion secondary battery were prepared in the same manner as in Example 1, except that:

8.4 g of the first sacrificial layer precursor substance (elementary substance Ti), 8.4 g of the second sacrificial layer precursor substance (elementary substance Al) and 8.4 g of the third sacrificial layer precursor substance (MgO) were weighed, wherein the weight ratio of the three sacrificial layer precursor materials was 1:1:1, and mixed evenly as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of the weight of the bulk phase (lithium nickel cobalt manganate).

25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1025.0 g of the first coating product were added to the mixer and mixed evenly, wherein the weight of the hydrogen fluoride barrier layer precursor material was 5% (wt/wt) of the weight of the bulk phase (lithium nickel cobalt manganate).

0.067 g of the first physical barrier layer precursor substance (elementary substance W), 0.067 g of the second physical barrier layer precursor substance (elementary substance Zr) and 0.067 g of the third physical barrier layer precursor substance ($Al_2O_3$) were weighed, wherein the weight ratio of the three physical barrier layer precursor materials was 1:1:1, and mixed evenly as the physical barrier layer precursor material. 0.2 g of the physical barrier layer precursor material and 1075.0 g of the second coating product were added to the mixer and mixed evenly, wherein the weight of the physical barrier layer precursor material was 0.02% (wt/wt) of the weight of the bulk phase (lithium nickel cobalt manganate).

EXAMPLE 5

The composite cathode active material and lithium ion secondary battery were prepared in the same manner as in Example 1, except that:

8.4 g of the first sacrificial layer precursor substance (elementary substance Ti), 8.4 g of the second sacrificial layer precursor substance (elementary substance Al) and 8.4 g of the third sacrificial layer precursor substance (MgO) were weighed, wherein the weight ratio of the three sacrificial layer precursor materials was 1:1:1, and mixed evenly as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of the weight of the bulk phase (lithium nickel cobalt manganate).

0.1 g of the first hydrogen fluoride barrier layer precursor substance (Nb) and 0.1 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 0.2 g of the hydrogen fluoride barrier layer precursor material and 1025.0 g of the first coating product were added to the mixer and mixed evenly, wherein the weight of the hydrogen fluoride barrier layer precursor material was 0.02% (wt/wt) of the weight of the bulk phase (lithium nickel cobalt manganate).

8.4 g of the first physical barrier layer precursor substance (elementary substance W), 8.4 g of the second physical barrier layer precursor substance (elementary substance Zr) and 8.4 g of the third physical barrier layer precursor substance ($Al_2O_3$) were weighed, wherein the weight ratio of the three physical barrier layer precursor materials was 1:1:1, and mixed evenly as the physical barrier layer precursor material. 25.0 g of the physical barrier layer precursor material and 1025.2 g of the second coating product were added to the mixer and mixed evenly, wherein the weight of the physical barrier layer precursor material was 2.5% (wt/wt) of the weight of the bulk phase (lithium nickel cobalt manganate).

EXAMPLE 6

The composite cathode active material and lithium ion secondary battery were prepared in the same manner as in Example 1, except that:

0.067 g of the first sacrificial layer precursor substance (elementary substance Ti), 0.067 g of the second sacrificial layer precursor substance (elementary substance Al) and 0.067 g of the third sacrificial layer precursor substance (MgO) were weighed, wherein the weight ratio of the three sacrificial layer precursor materials was 1:1:1, and mixed evenly as the sacrificial layer precursor material. 0.2 g of the sacrificial layer precursor material and 1000.0 g of lithium nickel cobalt manganate were added to the mixer and mixed evenly, wherein the weight of the sacrificial layer precursor material was 0.02% (wt/wt) of the weight of the bulk phase (lithium nickel cobalt manganate).

25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1000.2 g of the first coating product were added to the mixer and mixed evenly, wherein the weight of the hydrogen fluoride barrier layer precursor material was 5% (wt/wt) of the weight of the bulk phase (lithium nickel cobalt manganate).

8.4 g of the first physical barrier layer precursor substance (elementary substance W), 8.4 g of the second physical barrier layer precursor substance (elementary substance Zr) and 8.4 g of the third physical barrier layer precursor substance ($Al_2O_3$) were weighed, wherein the weight ratio of the three physical barrier layer precursor materials was 1:1:1, and mixed evenly as the physical barrier layer precursor material. 25.0 g of the physical barrier layer precursor material and 1050.2 g of the second coating product were added to the mixer and mixed evenly, wherein the weight of the physical barrier layer precursor material was 2.5% (wt/wt) of the weight of the bulk phase (lithium nickel cobalt manganate).

EXAMPLE 7

Preparation of Composite Cathode Active Material 25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1050.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate). The mixed materials were placed in a roasting furnace and calcined at a temperature of about 350° C. for 2 hours. The calcined product was taken out, crushed with a crusher, and then sieved with a 200 mesh sieve to obtain the hydrogen fluoride barrier layer coating product (the cathode active material coated with a hydrogen fluoride barrier layer).

8.4 g of the first physical barrier layer precursor substance (elementary substance W), 8.4 g of the second physical barrier layer precursor substance (elementary substance Zr) and 8.4 g of the third physical barrier layer precursor substance ($Al_2O_3$) were weighed, and mixed evenly as the physical barrier layer precursor material. 25.0 g of the physical barrier layer precursor material and 1050.0 g of the hydrogen fluoride barrier layer coating product were added to the mixer and mixed evenly, wherein the weight of the physical barrier layer precursor material was 2.5% (wt/wt) of the weight of the bulk phase (lithium nickel cobalt manganate). The mixed materials were placed in a roasting furnace and calcined at a temperature of about 550° C. for 2 hours. The calcined product was taken out, crushed with a crusher, and then sieved with a 200 mesh sieve to obtain the composite cathode active material.

The lithium ion secondary battery was prepared by the same method as Example 1.

EXAMPLE 8

Preparation of Composite Cathode Active Material 25.0 g of $ZrO_2$ was weighed as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of the weight of the bulk phase (lithium nickel cobalt manganate). The mixed materials were placed in a roasting furnace and calcined at a temperature of about 300° C. for 2 hours. The calcined product was taken out, crushed with a crusher, and then sieved with a 200 mesh sieve to obtain the first coating product (the cathode active material coated with a sacrificial layer).

50.0 g of $MgF_2$ was weighed as the hydrogen fluoride barrier layer precursor material. 50.0 g of the hydrogen fluoride barrier layer precursor material and 1025.0 g of the first coating product were added to the mixer and mixed evenly. The mixed materials were placed in a roasting furnace, wherein the weight of the physical barrier layer precursor material was 5% (wt/wt) of the weight of the bulk phase (lithium nickel cobalt manganate), and calcined at a temperature of about 350° C. for 2 hours. The calcined product was taken out, crushed with a crusher, and then sieved with a 200 mesh sieve to obtain the second coating product (the cathode active material coated with a sacrificial layer and a hydrogen fluoride barrier layer).

12.5 g of the first physical barrier layer precursor substance (elementary substance Sc), and 12.5 g of the second physical barrier layer precursor substance ($ZrO_2$) were mixed evenly as the physical barrier layer precursor material. 25.0 g of the physical barrier layer precursor material and 1075.0 g of the second coating product were added to the mixer and mixed evenly, wherein the weight of the physical barrier layer precursor material was 2.5% (wt/wt) of the weight of the bulk phase (lithium nickel cobalt manganate). The mixed materials were placed in a roasting furnace and calcined at a temperature of about 550° C. for 2 hours. The calcined product was taken out, crushed with a crusher, and then sieved with a 200 mesh sieve to obtain the composite cathode active material.

The lithium ion secondary battery was prepared by the same method as Example 1.

EXAMPLE 9

Preparation of Composite Cathode Active Material 25.0 g of $Mg(BO_3)_2$ was weighed as the sacrificial layer precursor material. 25.0 g of the sacrificial layer precursor material and 1000.0 g of lithium nickel cobalt manganate were placed into the mixer and mixed evenly, wherein the weight of the sacrificial layer precursor material was 2.5% (wt/wt) of the weight of the bulk phase (lithium nickel cobalt manganate). The mixed materials were placed in a roasting furnace and calcined at a temperature of about 300° C. for 2 hours. The calcined product was taken out, crushed with a crusher, and then sieved with a 200 mesh sieve to obtain the first coating product.

50.0 g of $NbBO_4$ was weighed as the hydrogen fluoride barrier layer precursor material. 50.0 g of the hydrogen fluoride barrier layer precursor material and 1025.0 g of the first coating product were added to the mixer and mixed evenly, wherein the weight of the hydrogen fluoride barrier layer precursor material was 5% (wt/wt) of the weight of the bulk phase (lithium nickel cobalt manganate). The mixed materials were placed in a roasting furnace and calcined at a temperature of about 350° C. for 2 hours. The calcined product was taken out, crushed with a crusher, and then sieved with a 200 mesh sieve to obtain the second coating product.

25.0 g of elementary substance Nb was weighed as the physical barrier layer precursor material. 25.0 g of the physical barrier layer precursor material and 1075.0 g of the second coating product were added to the mixer and mixed evenly, wherein the weight of the physical barrier layer precursor material was 2.5% (wt/wt) of the weight of the bulk phase (lithium nickel cobalt manganate). The mixed materials were placed in a roasting furnace and calcined at a temperature of about 550° C. for 2 hours. The calcined product was taken out, crushed with a crusher, and then sieved with a 200 mesh sieve to obtain the composite cathode active material.

The lithium ion secondary battery was prepared by the same method as Example 1.

EXAMPLE 10

Preparation of Composite Cathode Active Material 12.5 g of elementary substance W and 12.5 g of $AlF_3$ were weighed and mixed evenly as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of the weight of the bulk phase (lithium nickel cobalt manganate). The mixed materials were placed in a roasting furnace and calcined at a temperature of about 300° C. for 2 hours. The calcined product was taken out, crushed with a crusher, and then sieved with a 200 mesh sieve to obtain the first coating product.

50.0 g of $ZrP_2O_7$ was weighed as the hydrogen fluoride barrier layer precursor material. 50.0 g of the hydrogen fluoride barrier layer precursor material and 1025.0 g of the first coating product were added to the mixer and mixed evenly, wherein the weight of the hydrogen fluoride barrier layer precursor material was 5% (wt/wt) of the weight of the bulk phase (lithium nickel cobalt manganate). The mixed materials were placed in a roasting furnace and calcined at a temperature of about 350° C. for 2 hours. The calcined product was taken out, crushed with a crusher, and then sieved with a 200 mesh sieve to obtain the second coating product.

25.0 g of Zn was weighed as the physical barrier layer precursor material. 25.0 g of the physical barrier layer precursor material and 1075.0 g of the second coating product were added to the mixer and mixed evenly, wherein the weight of the physical barrier layer precursor material was 2.5% (wt/wt) of the weight of the bulk phase (lithium nickel cobalt manganate). The mixed materials were placed in a roasting furnace and calcined at a temperature of about 550° C. for 2 hours. The calcined product was taken out, crushed with a crusher, and then sieved with a 200 mesh sieve to obtain the composite cathode active material.

The lithium ion secondary battery was prepared by the same method as Example 1.

EXAMPLE 11

Preparation of Composite Cathode Active Material 25.0 g of $Al_2O_3$ was weighed as the sacrificial layer precursor material. 25.0 g of the sacrificial layer precursor material and 1000.0 g of lithium nickel cobalt manganate were added to the mixer and mixed evenly, wherein the weight of the sacrificial layer precursor material was 2.5% (wt/wt) of the weight of the bulk phase (lithium nickel cobalt manganate). The mixed materials were placed in a roasting furnace and calcined at a temperature of about 300° C. for 2 hours. The calcined product was taken out, crushed with a crusher, and then sieved with a 200 mesh sieve to obtain the first coating product.

50.0 g of $Mn_2PO_4F$ was weighed as the hydrogen fluoride barrier layer precursor material. 50.0 g of the hydrogen fluoride barrier layer precursor material and 1025.0 g of the first coating product were added to the mixer and mixed evenly, wherein the weight of the hydrogen fluoride barrier layer precursor material was 5% (wt/wt) of the weight of the bulk phase (lithium nickel cobalt manganate). The mixed materials were placed in a roasting furnace and calcined at a temperature of about 350° C. for 2 hours. The calcined product was taken out, crushed with a crusher, and then sieved with a 200 mesh sieve to obtain the second coating product.

25.0 g of $AlPO_4$ was weighed as the physical barrier layer precursor material. 25.0 g of the physical barrier layer precursor material and 1075.0 g of the second coating product were added to the mixer and mixed evenly, wherein the weight of the physical barrier layer precursor material was 2.5% (wt/wt) of the weight of the bulk phase (lithium nickel cobalt manganate). The mixed materials were placed in a roasting furnace and calcined at a temperature of about 550° C. for 2 hours. The calcined product was taken out, crushed with a crusher, and then sieved with a 200 mesh sieve to obtain the composite cathode active material.

The lithium ion secondary battery was prepared by the same method as Example 1.

EXAMPLE 12

The composite cathode active material and lithium ion secondary battery were prepared in the same manner as in Example 7, except that:

50.0 g of $Al_2O_3$ was weighed as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

50.0 g of elementary substance Ta was weighed as the physical barrier layer precursor material. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 13

The composite cathode active material and lithium ion secondary battery were prepared in the same manner as in Example 7, except that:

50.0 g of MgO was weighed as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

50.0 g of elementary substance Zr was weighed as the physical barrier layer precursor material. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 14

The composite cathode active material and lithium ion secondary battery were prepared in the same manner as in Example 7, except that:

50.0 g of $ZrO_2$ was weighed as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

50.0 g of elementary substance Al was weighed as the physical barrier layer precursor material. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 15

The composite cathode active material and lithium ion secondary battery were prepared in the same manner as in Example 7, except that:

25.0 g of $Al_2O_3$ and 25.0 g of MgO were weighed and mixed evenly as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

25.0 g of elementary substance Ta and 25.0 g of elementary substance Zr were weighed and mixed evenly as the physical barrier layer precursor material. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 16

The composite cathode active material and lithium ion secondary battery were prepared in the same manner as in Example 7, except that:

25.0 g of $ZrO_2$ and 25.0 g of $Mg(BO_3)_2$ were weighed and mixed evenly as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

25.0 g of elementary substance Al and 25.0 g of elementary substance Nb were weighed and mixed evenly as the physical barrier layer precursor material. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 17

The composite cathode active material and lithium ion secondary battery were prepared in the same manner as in Example 7, except that:

16.7 g of elementary substance Nb and 33.3 g of $MgF_2$ were weighed and mixed evenly as the hydrogen fluoride barrier layer precursor material, wherein the weight ratio of the two hydrogen fluoride barrier layer precursor materials was 1:2. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

12.5 g of the elementary substance W, 25.0 g of the elementary substance Zr and 12.5 g of $Al_2O_3$ were weighed and mixed evenly as the physical barrier layer precursor material, wherein the weight ratio of the three physical barrier layer precursor materials was 1:2:1. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 18

The composite cathode active material and lithium ion secondary battery were prepared in the same manner as in Example 7, except that:

33.3 g of elementary substance Nb and 16.7 g of $MgF_2$ were weighed and mixed evenly as the hydrogen fluoride barrier layer precursor material, wherein the weight ratio of the two hydrogen fluoride barrier layer precursor materials was 2:1. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

12.5 g of the elementary substance W, 12.5 g of the elementary substance Zr and 25.0 g of $Al_2O_3$ were weighed and mixed evenly as the physical barrier layer precursor material, wherein the weight ratio of the three physical barrier layer precursor materials was 1:1:2. 50.0 g of the physical barrier layer precursor material and 1050.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

EXAMPLE 19

The composite cathode active material and lithium ion secondary battery were prepared in the same manner as in Example 1, except that:

12.5 g of the first sacrificial layer precursor substance (elementary substance Ti), 25.0 g of the second sacrificial layer precursor substance (elementary substance Al) and 12.5 g of the third sacrificial layer precursor substance (MgO) were weighed, wherein the weight ratio of the three sacrificial layer precursor materials was 1:2:1, and mixed evenly as the sacrificial layer precursor material. 50.0 g of the sacrificial layer precursor material and 1000.0 g of lithium nickel cobalt manganate were added to the mixer and mixed evenly, wherein the weight of the sacrificial layer precursor material was 5% (wt/wt) of the weight of the bulk phase (lithium nickel cobalt manganate).

16.7 g of the first hydrogen fluoride barrier layer precursor substance (Nb) and 33.3 g of the second hydrogen fluoride barrier layer precursor substance ($MgF_2$) were weighed, wherein the weight ratio of the two hydrogen fluoride barrier precursor materials was 1:2, and mixed evenly as the hydrogen fluoride barrier layer precursor material. 50.0 g of the hydrogen fluoride barrier layer precursor material and 1050.0 g of the first coating product were added to the mixer and mixed evenly, wherein the weight of the hydrogen fluoride barrier layer precursor material was 5% (wt/wt) of the weight of the bulk phase (lithium nickel cobalt manganate).

12.5 g of the first physical barrier layer precursor substance (elementary substance W), 25.0 g of the second physical barrier layer precursor substance (elementary substance Zr) and 12.5 g of the third physical barrier layer precursor substance ($Al_2O_3$) were weighed, wherein the weight ratio of the three physical barrier layer precursor materials was 1:2:1, and mixed evenly as the physical barrier layer precursor material. 50.0 g of the physical barrier layer precursor material and 1100.0 g of the second coating product were added to the mixer and mixed evenly, wherein the weight of the physical barrier layer precursor material was 5% (wt/wt) of the weight of the bulk phase (lithium nickel cobalt manganate).

EXAMPLE 20

The composite cathode active material and lithium ion secondary battery were prepared in the same manner as in Example 1, except that:

12.5 g of the first sacrificial layer precursor substance (elementary substance Ti), 12.5 g of the second sacrificial layer precursor substance (elementary substance Al) and 25.0 g of the third sacrificial layer precursor substance (MgO) were weighed, wherein the weight ratio of the three sacrificial layer precursor materials was 1:1:2, and mixed evenly as the sacrificial layer precursor material. 50.0 g of the sacrificial layer precursor material and 1000.0 g of lithium nickel cobalt manganate were added to the mixer and mixed evenly, wherein the weight of the sacrificial layer precursor material was 5% (wt/wt) of the weight of the bulk phase (lithium nickel cobalt manganate).

33.3 g of the first hydrogen fluoride barrier layer precursor substance (Nb) and 16.7 g of the second hydrogen fluoride barrier layer precursor substance ($MgF_2$) were weighed, wherein the weight ratio of the two hydrogen fluoride barrier precursor materials was 2:1, and mixed evenly as the hydrogen fluoride barrier layer precursor material. 50.0 g of the hydrogen fluoride barrier layer precursor material and 1050.0 g of the first coating product were added to the mixer and mixed evenly, wherein the weight of the hydrogen fluoride barrier layer precursor material was 5% (wt/wt) of the weight of the bulk phase (lithium nickel cobalt manganate).

12.5 g of the first physical barrier layer precursor substance (elementary substance W), 12.5 g of the second physical barrier layer precursor substance (elementary substance Zr) and 25.0 g of the third physical barrier layer precursor substance ($Al_2O_3$) were weighed, wherein the weight ratio of the three physical barrier layer precursor materials was 1:1:2, and mixed evenly as the physical barrier layer precursor material. 50.0 g of the physical barrier layer precursor material and 1100.0 g of the second coating product were added to the mixer and mixed evenly, wherein the weight of the physical barrier layer precursor material was 5% (wt/wt) of the weight of the bulk phase (lithium nickel cobalt manganate).

EXAMPLE 21

The composite cathode active material and lithium ion secondary battery were prepared in the same manner as in Example 1, except that:

11.67 g of the first sacrificial layer precursor substance (elementary substance Ti), 11.67 g of the second sacrificial layer precursor substance (elementary substance Al) and 11.67 g of the third sacrificial layer precursor substance (MgO) were weighed, wherein the weight ratio of the three sacrificial layer precursor materials was 1:1:1, and mixed evenly as the sacrificial layer precursor material. 35.0 g of the sacrificial layer precursor material and 1000.0 g of lithium nickel cobalt manganate were added to the mixer and mixed evenly, wherein the weight of the sacrificial layer precursor material was 3.5% (wt/wt) of the weight of the bulk phase (lithium nickel cobalt manganate).

37.5 g of the first hydrogen fluoride barrier layer precursor substance (Nb) and 37.5 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 75.0 g of the hydrogen fluoride barrier layer precursor material and 1035.0 g of the first coating product were added to the mixer and mixed evenly, wherein the weight of the hydrogen fluoride barrier layer precursor material was 7.5% (wt/wt) of the weight of the bulk phase (lithium nickel cobalt manganate).

11.67 g of the first physical barrier layer precursor substance (elementary substance W), 11.67 g of the second physical barrier layer precursor substance (elementary substance Zr) and 11.67 g of the third physical barrier layer precursor substance ($Al_2O_3$) were weighed, wherein the weight ratio of the three physical barrier layer precursor materials was 1:1:1, and mixed evenly as the physical barrier layer precursor material. 35.0 g of the physical barrier layer precursor material and 1110.0 g of the second coating product were added to the mixer and mixed evenly, wherein the weight of the physical barrier layer precursor material was 3.5% (wt/wt) of the weight of the bulk phase (lithium nickel cobalt manganate).

EXAMPLE 22

The composite cathode active material and lithium ion secondary battery were prepared in the same manner as in Example 1, except that:

6.67 g of the first sacrificial layer precursor substance (elementary substance Ti), 6.67 g of the second sacrificial layer precursor substance (elementary substance Al) and 6.67 g of the third sacrificial layer precursor substance (MgO) were weighed, wherein the weight ratio of the three sacrificial layer precursor materials was 1:1:1, and mixed evenly as the sacrificial layer precursor material. 20.0 g of the sacrificial layer precursor material and 1000.0 g of lithium nickel cobalt manganate were added to the mixer and mixed evenly, wherein the weight of the sacrificial layer precursor material was 2% (wt/wt) of the weight of the bulk phase (lithium nickel cobalt manganate).

10.0 g of the first hydrogen fluoride barrier layer precursor substance (Nb) and 10.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 20.0 g of the hydrogen fluoride barrier layer precursor material and 1020.0 g of the first coating product were added to the mixer and mixed evenly, wherein the weight of the hydrogen fluoride barrier layer precursor material was 2% (wt/wt) of the weight of the bulk phase (lithium nickel cobalt manganate).

3.33 g of the first physical barrier layer precursor substance (elementary substance W), 3.33 g of the second physical barrier layer precursor substance (elementary substance Zr) and 3.33 g of the third physical barrier layer precursor substance ($Al_2O_3$) were weighed, wherein the weight ratio of the three physical barrier layer precursor materials was 1:1:1, and mixed evenly as the physical barrier layer precursor material. 10.0 g of the physical barrier layer precursor material and 1040.0 g of the second coating product were added to the mixer and mixed evenly, wherein the weight of the physical barrier layer precursor material was 1% (wt/wt) of the weight of the bulk phase (lithium nickel cobalt manganate).

COMPARATIVE EXAMPLE 1

Preparation of Composite Cathode Active Material 25.0 g of $Al_2O_3$ and 1000.0 g of lithium nickel cobalt manganate were weighed and added into the mixer and mixed evenly. The mixed materials were placed in a roasting furnace and calcined at a temperature of about 300° C. for 2 hours. The calcined product was taken out, crushed with a crusher, and then sieved with a 200 mesh sieve to obtain the first coating product.

50.0 g of ZnO and 1025.0 g of the first coating product were weighed and added to the mixer and mixed evenly. The mixed materials were placed in a roasting furnace and calcined at a temperature of about 350° C. for 2 hours. The calcined product was taken out, crushed with a crusher, and then sieved with a 200 mesh sieve to obtain the second coating product.

25.0 g of $Al_2O_3$ and 1075.0 g of the second coating product were weighed and added to the mixer and mixed evenly. The mixed materials were placed in a roasting furnace and calcined at a temperature of about 550° C. for 2 hours. The calcined product was taken out, crushed with a crusher, and then sieved with a 200 mesh sieve to obtain the composite cathode active material.

The lithium ion secondary battery was prepared by the same method as Example 1.

COMPARATIVE EXAMPLE 2

The composite cathode active material and lithium ion secondary battery were prepared in the same manner as in Example 7, except that:

50.0 g of MgO was weighed as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

0.033 g of the elementary substance W, 0.033 g of the elementary substance Zr and 0.033 g of $Al_2O_3$ were weighed and mixed evenly as the physical barrier layer precursor material, wherein the weight ratio of the three physical barrier layer precursor materials was 1:1:1. 0.1 g of the physical barrier layer precursor material and 1050.0 g of the hydrogen fluoride barrier layer coating product were added to the mixer and mixed evenly, wherein the weight of the physical barrier layer precursor material was 0.01% (wt/wt) of the weight of the bulk phase (lithium nickel cobalt manganate).

COMPARATIVE EXAMPLE 3

The composite cathode active material and lithium ion secondary battery were prepared in the same manner as in Example 7, except that:

50.0 g of MgO was weighed as the hydrogen fluoride barrier layer precursor material. 50.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 5% (wt/wt) of the weight of the bulk phase (lithium nickel cobalt manganate).

25.0 g of the elementary substance W, 25.0 g of the elementary substance Zr and 25.0 g of $Al_2O_3$ were weighed and mixed evenly as the physical barrier layer precursor material, wherein the weight ratio of the three physical barrier layer precursor materials was 1:1:1. 75.0 g of the physical barrier layer precursor material and 1050.0 g of the hydrogen fluoride barrier layer coating product were added to the mixer and mixed evenly, wherein the weight of the physical barrier layer precursor material was 7.5% (wt/wt) of the weight of the bulk phase (lithium nickel cobalt manganate).

COMPARATIVE EXAMPLE 4

The composite cathode active material and lithium ion secondary battery were prepared in the same manner as in Example 7, except that:

0.05 g of elementary substance Nb and 0.05 g of $MgF_2$ were weighed and mixed evenly as the hydrogen fluoride barrier layer precursor material, wherein the weight ratio of the two hydrogen fluoride barrier layer precursor materials was 1:1. 0.1 g of the hydrogen fluoride barrier layer precursor material and 1000.0 g of the lithium nickel cobalt manganate were added to the mixer and mixed evenly, wherein the weight of the hydrogen fluoride barrier layer precursor material was 0.01% (wt/wt) of the weight of the bulk phase (lithium nickel cobalt manganate).

16.7 g of the elementary substance W, 16.7 g of the elementary substance Zr and 16.7 g of $Al_2O_3$ were weighed and mixed evenly as the physical barrier layer precursor material, wherein the weight ratio of the three physical barrier layer precursor materials was 1:1:1. 50.0 g of the physical barrier layer precursor material and 1000.1 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

COMPARATIVE EXAMPLE 5

The composite cathode active material and lithium ion secondary battery were prepared in the same manner as in Example 7, except that:

60.0 g of elementary substance Nb and 60.0 g of $MgF_2$ were weighed and mixed evenly as the hydrogen fluoride barrier layer precursor material, wherein the weight ratio of the two hydrogen fluoride barrier layer precursor materials was 1:1. 120.0 g of the hydrogen fluoride barrier layer precursor material and 1000.0 g of the lithium nickel cobalt manganate were added to the mixer and mixed evenly, wherein the weight of the hydrogen fluoride barrier layer precursor material was 12% (wt/wt) of the weight of the bulk phase (lithium nickel cobalt manganate).

16.7 g of the elementary substance W, 16.7 g of the elementary substance Zr and 16.7 g of $Al_2O_3$ were weighed and mixed evenly as the physical barrier layer precursor material, wherein the weight ratio of the three physical barrier layer precursor materials was 1:1:1. 50.0 g of the physical barrier layer precursor material and 1120.0 g of the hydrogen fluoride barrier layer coating product were added to the mixer and mixed evenly, wherein the weight of the physical barrier layer precursor material was 5% (wt/wt) of the weight of the bulk phase (lithium nickel cobalt manganate).

COMPARATIVE EXAMPLE 6

The composite cathode active material and lithium ion secondary battery were prepared in the same manner as in Example 1, except that:

0.033 g of the first sacrificial layer precursor substance (elementary substance Ti), 0.033 g of the second sacrificial layer precursor substance (elementary substance Al) and 0.033 g of the third sacrificial layer precursor substance (MgO) were weighed, wherein the weight ratio of the three sacrificial layer precursor materials was 1:1:1, and mixed evenly as the sacrificial layer precursor material. 0.1 g of the sacrificial layer precursor material and 1000.0 g of lithium nickel cobalt manganate were added to the mixer and mixed evenly, wherein the weight of the sacrificial layer precursor material was 0.01% (wt/wt) of the weight of the bulk phase (lithium nickel cobalt manganate).

25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1000.1 g of the first coating product were added to the mixer and mixed evenly, wherein the weight of the hydrogen fluoride barrier layer precursor material was 5% (wt/wt) of the weight of the bulk phase (lithium nickel cobalt manganate).

16.7 g of the first physical barrier layer precursor substance (elementary substance W), 16.7 g of the second physical barrier layer precursor substance (elementary substance Zr) and 16.7 g of the third physical barrier layer precursor substance ($Al_2O_3$) were weighed, wherein the weight ratio of the three physical barrier layer precursor materials was 1:1:1, and mixed evenly as the physical barrier layer precursor material. 50.0 g of the physical barrier layer precursor material and 1050.1 g of the second coating product were added to the mixer and mixed evenly, wherein the weight of the physical barrier layer precursor material was 5% (wt/wt) of the weight of the bulk phase (lithium nickel cobalt manganate).

COMPARATIVE EXAMPLE 7

25.0 g of the first sacrificial layer precursor substance (elementary substance Ti), 25.0 g of the second sacrificial layer precursor substance (elementary substance Al) and 25.0 g of the third sacrificial layer precursor substance (MgO) were weighed, wherein the weight ratio of the three sacrificial layer precursor materials was 1:1:1, and mixed evenly as the sacrificial layer precursor material. 75.0 g of the sacrificial layer precursor material and 1000.0 g of lithium nickel cobalt manganate were added to the mixer and mixed evenly, wherein the weight of the sacrificial layer precursor material was 7.5% (wt/wt) of the weight of the bulk phase (lithium nickel cobalt manganate).

25.0 g of the first hydrogen fluoride barrier layer precursor substance (Nb) and 25.0 g of the second hydrogen fluoride barrier layer precursor substance ($MgF_2$) were weighed, wherein the weight ratio of the two hydrogen fluoride barrier precursor materials was 1:1, and mixed evenly as the hydrogen fluoride barrier layer precursor material. 50.0 g of the hydrogen fluoride barrier layer precursor material and 1050.0 g of the first coating product were added to the mixer and mixed evenly, wherein the weight of the hydrogen fluoride barrier layer precursor material was 5% (wt/wt) of the weight of the bulk phase (lithium nickel cobalt manganate).

16.7 g of the first physical barrier layer precursor substance (elementary substance W), 16.7 g of the second physical barrier layer precursor substance (elementary substance Zr) and 16.7 g of the third physical barrier layer precursor substance ($Al_2O_3$) were weighed, wherein the weight ratio of the three physical barrier layer precursor materials was 1:1:1, and mixed evenly as the physical barrier layer precursor material. 50.0 g of the physical barrier layer precursor material and 1100.0 g of the second coating product were added to the mixer and mixed evenly, wherein the weight of the physical barrier layer precursor material was 5% (wt/wt) of the weight of the bulk phase (lithium nickel cobalt manganate).

COMPARATIVE EXAMPLE 8

No coating treatment was performed on the cathode active material (nickel cobalt lithium manganate).

The lithium ion secondary battery was prepared by the same method as Example 1.

Test for Battery Performance

Measurement of Capacity Retention Rate

The capacity retention rate of the lithium ion secondary batteries produced by the above described Examples and Comparative Examples was measured as follows. Firstly, the batteries were charged at conditions of an ambient temperature of 23° C., a charging voltage of 4.35 V, a charging current of 0.5 mA and a charging time of 10 hours, then discharged at conditions of a discharge current of 2.5 mA and a termination voltage of 3.0 V, and the initial discharge capacity (discharge capacity of the first cycle) was measured. Next, repeated charges and discharges were performed at charging conditions of an ambient temperature of 23° C., a charging voltage of 4.35 V, a charging current of 0.5 mA and a charging time of 10 hours and discharging conditions of a discharge current of 2.5 mA and a termination voltage of 3.0 V. Then, the discharge capacity of the $100^{th}$ cycle was measured. Subsequently, the capacity retention rate (%) after 100 cycles was calculated using the discharge capacity of the first cycle and the discharge capacity of the $100^{th}$ cycle based on the following formula.

Capacity retention rate (%) after 100 cycles=(Discharge capacity of the $100^{th}$ cycle/Discharge capacity of the first cycle)×100

Measurement of Impedance

The lithium ion secondary battery was maintained at 60° C., charged once at 0.5 C, and then the initial impedance value of the battery was determined. 100 charge-discharge cycles were performed at a temperature of 60° C., and the final impedance value of the battery was determined after completion. The impedance growth rate (%) of the battery is calculated by the following formula.

Impedance growth rate (%)=(Final impedance value−Initial impedance value)/Initial impedance value×100

Measurement of The Thickness of Composite Cathode Active Material

The thickness of the thin film was measured by XPS depth etching method firstly. If the measured thickness of the thin film was in the range of 1 to 10 μM, the measurement results were retained, and if the measured thickness of the thin film was greater than 10 μm, the field emission scanning electron microscope method was used for measurement, and the measured thickness of the thin film of more than 10 μM was retained.

Table 1 shows the evaluation results of the lithium ion secondary battery made of the composite cathode active material of the present invention contained in each Comparative Examples and Examples.

TABLE 1

| Examples | Thickness of Sacrificial Layer (nm) | Thickness of Hydrogen Fluoride Barrier Layer (nm) | Thickness of Physical Barrier Layer (nm) | Capacity (mAh/g) | Cycle Retention Rater After 100 Cycle (%) | Initial Impedance Value (Ω) | Final Impedance Value (Ω) | Impedance Growth Rate (%) |
|---|---|---|---|---|---|---|---|---|
| Example 1 | 125 | 250 | 250 | 185 | 86 | 12 | 24 | 100 |
| Example 2 | 125 | 500 | 125 | 185 | 90 | 10 | 18 | 80 |
| Example 3 | 250 | 250 | 125 | 185 | 90 | 10 | 20 | 100 |
| Example 4 | 125 | 250 | 1 | 190 | 90 | 8 | 17.6 | 120 |
| Example 5 | 125 | 1 | 125 | 190 | 86 | 8 | 17.6 | 120 |
| Example 6 | 1 | 250 | 125 | 190 | 86 | 8 | 17.6 | 120 |
| Example 7 | | 250 | 125 | 188 | 90 | 10 | 20 | 100 |
| Example 8 | 125 | 250 | 125 | 188 | 91 | 9 | 18.18 | 102 |
| Example 9 | 125 | 250 | 125 | 186 | 89 | 9 | 17.82 | 98 |
| Example 10 | 125 | 250 | 125 | 187 | 92 | 10 | 20 | 100 |
| Example 11 | 125 | 250 | 125 | 187 | 88 | 10 | 20.3 | 103 |
| Example 12 | | 250 | 250 | 188 | 91 | 9 | 18.18 | 102 |
| Example 13 | | 250 | 250 | 188 | 82 | 10 | 20.5 | 105 |
| Example 14 | | 250 | 250 | 188 | 83 | 10 | 21 | 110 |
| Example 15 | | 250 | 250 | 185 | 82 | 10 | 21 | 110 |
| Example 16 | | 250 | 250 | 184 | 83 | 12 | 24 | 100 |
| Example 17 | | 250 | 250 | 187 | 83 | 12 | 24 | 100 |
| Example 18 | | 250 | 250 | 186 | 87 | 11 | 22.33 | 103 |
| Example 19 | 250 | 250 | 250 | 185 | 88 | 12 | 24.6 | 105 |
| Example 20 | 250 | 250 | 250 | 184 | 85 | 11 | 22.22 | 102 |
| Example 21 | 175 | 375 | 175 | 182 | 85 | 13 | 25.87 | 99 |
| Example 22 | 100 | 100 | 50 | 187 | 88 | 15 | 28.5 | 90 |
| Comparative Example 1 | 125 | 250 | 250 | 182 | 75 | 20 | 60 | 200 |
| Comparative Example 2 | | 250 | 0.5 | 186 | 78 | 11 | 27.5 | 150 |
| Comparative Example 3 | | 250 | 375 | 182 | 82 | 15 | 30 | 100 |
| Comparative Example 4 | | 0.5 | 250 | 187 | 72 | 10 | 29 | 190 |
| Comparative Example 5 | | 600 | 250 | 183 | 76 | 15 | 39 | 160 |
| Comparative Example 6 | 0.5 | 250 | 250 | 187 | 81 | 11 | 23.1 | 110 |
| Comparative Example 7 | 375 | 250 | 250 | 182 | 85 | 16 | 31.52 | 97 |
| Comparative Example 8 | | | | 190 | 50 | 8 | 40 | 400 |

Note:
the layer thickness in Comparative Example 1 in the above table only represents the thickness of three layers at the corresponding position, not that the three layers in Comparative Example 1 may play the role of sacrificial layer, hydrogen fluoride barrier layer and physical barrier layer of the invention.

From the above experimental results, it may be seen that the above Examples of the present invention achieve the following technical effects: it may be seen from the comparison between the results of Examples 1-22 and Comparative Example 8 (no treatment being performed on the cathode active material) that after the composite cathode active material of the present application is used, the contacting and reacting of the hydrogen fluoride with cathode active material are effectively prevented, the dissolution of the metal in the cathode active material is inhibited, the stability of the crystal structure in the bulk phase of the cathode active material is ensured, so that the lithium ion secondary battery containing the same may still maintain good cycle retention rate after multiple cycles, and has a low initial impedance value and the growth of impedance is inhibited.

Through the comparison of the results of Example 7 and Comparative Example 3, it may be seen that when the thickness of the physical barrier layer is greater than the thickness defined in the present application, although the impedance growth rates of both are increased by 100%, due to the excessive thickness of the physical barrier layer, the initial impedance value and final impedance value are much higher than the experimental results of Example 7, and compared with the results of Comparative Example 3, the capacity and cycle retention rate of Example 7 are also significantly increased.

Through the comparison of the results of Example 7 and Comparative Example 5, it may be seen that when the thickness of the physical barrier layer is less than the thickness defined in the present application, where the initial impedance values are close, the final impedance value of Comparative Example 2 is much greater than the result of Example 7, the impedance growth rate reaches 150%, and the cycle retention rate of Comparative Example 2 is also much less than the result of Example 7.

Through the comparison of the results of Example 7 and Comparative Example 5, it may be seen that when the thickness of the hydrogen fluoride barrier layer is greater than the thickness defined in the present application, the capacity of Comparative Example 5 is close to the result of Example 7, but the initial impedance value, final impedance value and impedance growth rate of Example 7 are much less than those of Comparative Example 5. At the same time, Example 7 achieves a better cycle retention rate.

Through the comparison of the results of Example 7 and Comparative Example 4, it may be seen that when the thickness of the hydrogen fluoride barrier layer is less than the thickness defined in the present application, when the initial impedance values of both are 10Ω, the final impedance value of Example 7 is only 20Ω, which is much less than the result of Comparative Example 4, reducing the impedance growth rate. Meanwhile, compared with Comparative Example 4, Example 7 achieves an excellent cycle retention rate.

Through the comparison of the results of Example 1 and Comparative Example 7, it may be seen that when the thickness of the sacrificial layer is greater than the thickness defined in the present application, although the impedance growth rate of Comparative Example 7 is lower than that of Example 1, the Initial impedance value of Comparative Example 7 (16Ω) is much higher than the result of Example 1, thus the final impedance value of Comparative Example 7 (31.52Ω) is unacceptable.

Through the comparison of the results of Example 1 and Comparative Example 6, it may be seen that when the thickness of the sacrificial layer is less than the thickness defined in the present application, the cycle retention rate of Comparative Example 6 decreases unacceptably (by 81%).

In addition, it may be seen from the results of Example 7, Examples 12-18 and Comparative Example 8 that where only the physical barrier layer and hydrogen fluoride barrier layer are included, the increase of cycle retention rate and the decrease of impedance growth rate may also be effectively realized.

The above description is only the preferred embodiment of the present invention, and is not intended to limit the present invention, and various modifications and changes may be made to the present invention for those skilled in the art. Any modifications, equivalent substitutions, improvements, and the like made within the spirit and principle of the present invention shall be included into the protection scope of the present invention.

The invention claimed is:

1. A composite cathode active material, comprising:

a core layer comprising a cathode active material;

a hydrogen fluoride barrier layer coating the core layer, the hydrogen fluoride barrier layer comprising a substance consisting of any one of Nb, Ba, Zr, Mn, Mg, Al and Ca or any combination thereof and any one of O, F, B and P or any combination thereof;

a physical barrier layer coating the hydrogen fluoride barrier layer; and a sacrificial layer arranged between the core layer and the hydrogen fluoride barrier layer, the sacrificial layer comprises a substance as shown by the formula below:

$$M''xA'yOz$$

wherein, x is an integer from 1 to 3, y is an integer from 0 to 4, and z is an integer from 0 to 12 such that the sum of the valence states of the compounds of the above general formula is zero, M" is any one selected from the group consisting of Ti, Al, Mg, Zr, Sr, Zn, W and Sc or any combination thereof, and A' is any one selected from the group consisting of F and B or any combination thereof.

2. The composite cathode active material according to claim 1, wherein, the hydrogen fluoride barrier layer comprises a substance consisting of any one of Nb, Zr, Mg, Al and Mn or any combination thereof and any one of O, F, B and P or any combination thereof.

3. The composite cathode active material according to claim 1, wherein, based on 100 parts by weight of the core layer, the amount of the hydrogen fluoride barrier layer is in the range of about 0.02 to about 10 parts by weight.

4. The composite cathode active material according to claim 1, wherein, the thickness of the hydrogen fluoride barrier layer is in the range of about 1 to about 500 nm.

5. The composite cathode active material according to claim 1, wherein, the physical barrier layer comprises a substance consisting of any one of Ta, W, Hf, Zr, Nb, Sc, Zn and Al or any combination thereof and any one of O and P or any combination thereof.

6. The composite cathode active material according to claim 1, wherein, based on 100 parts by weight of the core layer, the amount of the physical barrier layer is in the range of about 0.02 to about 5 parts by weight.

7. The composite cathode active material according to claim 1, wherein, the thickness of the physical barrier layer is in the range of about 1 to about 250 nm.

8. The composite cathode active material according to claim 1, wherein, the cathode active material comprises any one of composite lithium cobalt oxide with a general formula of $LiCo_{1-\alpha}M_{\alpha}O_2$, lithium nickel-cobalt manganate with a general formula of $LiNi_{1-x-y}Co_xMn_yO_2$ and lithium nickel-cobalt aluminate with a general formula of $LiNi_{1-x-y}Co_xAl_yO_2$ or any combination thereof, wherein $0<\alpha\leq 0.2$, $0\leq x\leq 1$, $0\leq y\leq 1$ and $0\leq x+y\leq 1$, M is selected from any one of alkaline earth metal elements and transition metal elements or any combination thereof, providing that the sum of the valence states of the compounds of the above general formula is zero.

9. The composite cathode active material according to claim 1, wherein, based on 100 parts by weight of the core layer, the amount of the sacrificial layer is in the range of about 0.02 to about 5 parts by weight.

10. The composite cathode active material according to claim 1, wherein, the thickness of the sacrificial layer is in the range of about 1 to about 250 nm.

11. A cathode sheet of a lithium ion secondary battery, wherein, the cathode sheet comprises the composite cathode active material according to claim 1.

* * * * *